(12) United States Patent
Kondo et al.

(10) Patent No.: US 6,446,050 B1
(45) Date of Patent: Sep. 3, 2002

(54) METHOD OF AND SYSTEM FOR PROCESSING ELECTRONIC DOCUMENT AND RECORDING MEDIUM FOR RECORDING PROCESSING PROGRAM

(75) Inventors: Kaori Kondo, Yamato; Tetsuya Masuishi, Machida; Masasuke Tominaga, Sagamihara; Rie Kobayashi, Tokyo; Takashi Odajima, Yokoyama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/190,005

(22) Filed: Nov. 12, 1998

(30) Foreign Application Priority Data

Nov. 14, 1997 (JP) .............................................. 9-313779

(51) Int. Cl.$^7$ .............................................. G06F 17/60
(52) U.S. Cl. ............................... 705/51; 705/1; 705/50; 705/54
(58) Field of Search .............................. 705/51, 52, 64, 705/71, 75, 7, 8

(56) References Cited

U.S. PATENT DOCUMENTS

| | | | | |
|---|---|---|---|---|
| 5,497,421 A | * | 3/1996 | Kaufmann et al. | 380/23 |
| 5,638,448 A | * | 6/1997 | Nguyen | 380/29 |
| 5,673,316 A | * | 9/1997 | Auerbach et al. | 380/4 |
| 5,892,900 A | * | 4/1999 | Ginter et al. | 395/186 |
| 6,021,202 A | * | 2/2000 | Anderson et al. | 380/25 |
| 6,178,243 B1 | * | 1/2001 | Pomerantz et al. | 380/243 |

FOREIGN PATENT DOCUMENTS

JP 10153954 A * 6/1998 ............ G09C/1/00

OTHER PUBLICATIONS

Communications (Windows 95 communications tutorial), Leonhard, Woody, Oct. 1995, PC/Computing, p. 182.*

* cited by examiner

*Primary Examiner*—Hyung-Sub Sough
*Assistant Examiner*—Calvin L Hewitt, II
(74) *Attorney, Agent, or Firm*—Antonelli, Terry, Stout & Kraus, LLP

(57) ABSTRACT

In an electronic document circulating method of circulating an electronic document having a plurality of data blocks to a plurality of workers, a data block in a document is encrypted by using an encrypting key corresponding to a certain worker, and a document having the encrypted data block is transmitted and received over a network. A time necessary for encrypting and decrypting an electronic form may be reduced. The encrypted data block in the document is decrypted by using a decrypting key corresponding to a specific worker, and it is determined how to display the data block and execute a processing in response to whether or not the encrypted data block is decrypted correctly or the existence of the data block.

19 Claims, 23 Drawing Sheets

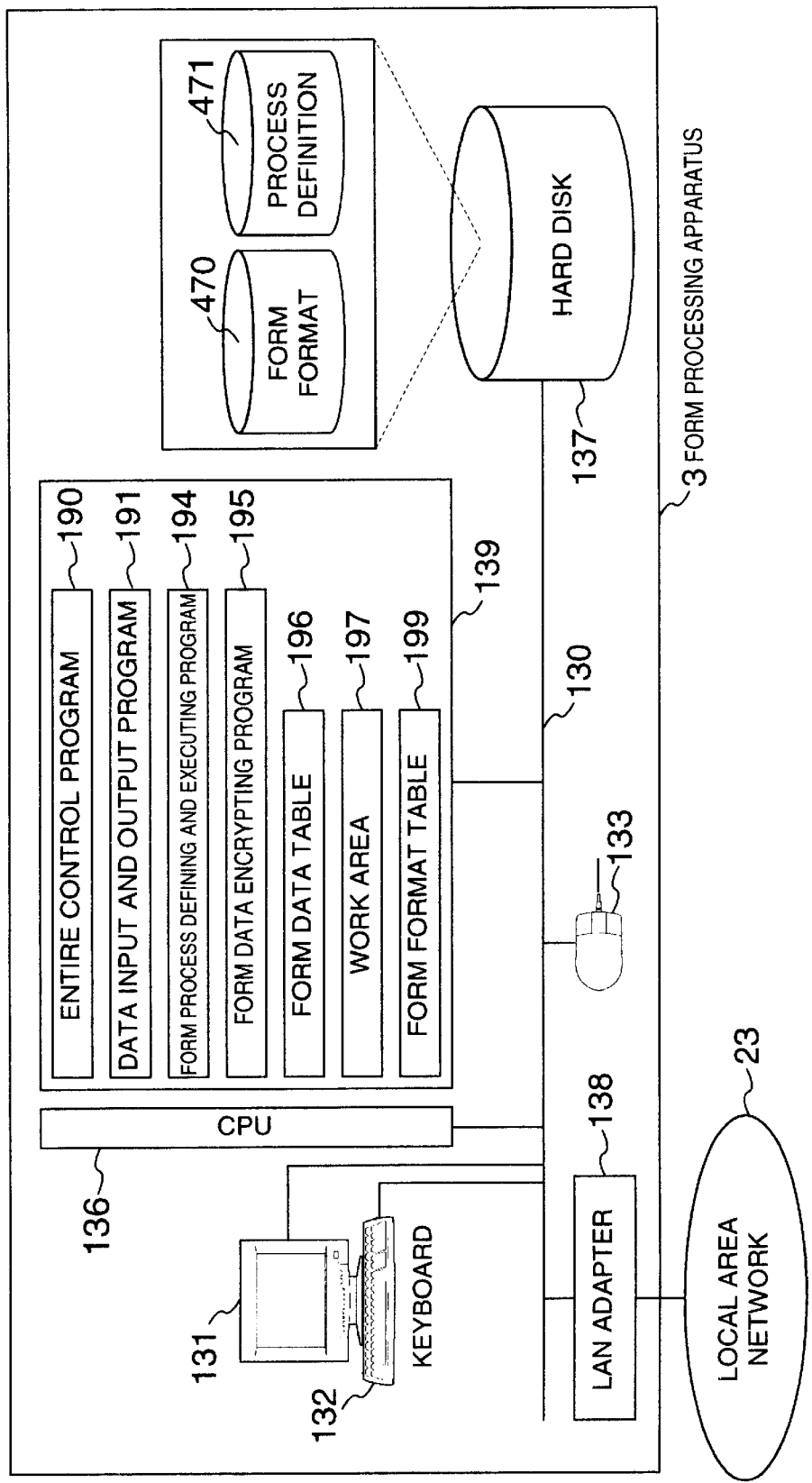

PRIVATE KEY FILE 451

PUBLIC KEY FILE 451

FIG. 7

PURCHASE ORDER FORM — 38

| CUSTOMER NAME | | | |
| ADDRESS | PURCHASE DATE | | |
| | MEMBERSHIP NUMBER | | |
| | PAYMENT CREDIT CARD NUMBER | | |

| COMMODITY NUMBER | TRADE NAME | UNIT COST | QUANTITY | MONEY AMOUNT | REMARK |
|---|---|---|---|---|---|
| | | | | | |
| | | | | | |
| | | | | | |
| | | | | | |

TOTAL MONEY AMOUNT

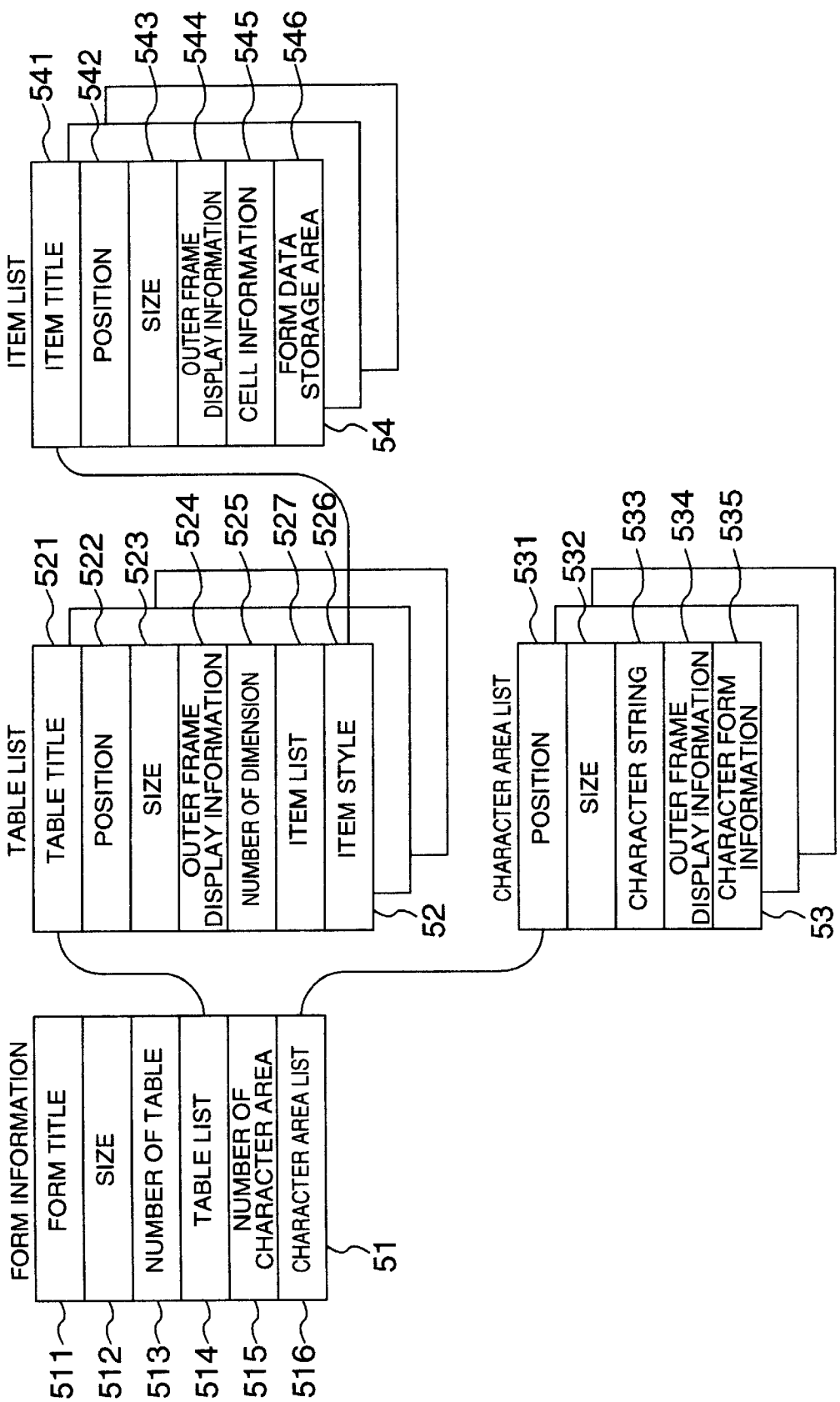

FIG. 15

PURCHASE ORDER FORM ~38

| CUSTOMER NAME | YAMADA TARO |
|---|---|
| ADDRESS | 890 KASHIMADA, SAIWAI-KU, KAWASAKI-SHI |

| PURCHASE DATE | 1997, 10, 3 |
|---|---|
| MEMBERSHIP NUMBER | 001-549-1703 |
| PAYMENT CREDIT CARD NUMBER | ************ |

| COMMODITY NUMBER | TRADE NAME | UNIT COST | QUANTITY | MONEY AMOUNT | REMARK |
|---|---|---|---|---|---|
| 001 | TOWEL GIFT SET | 3000 | 5 | 15000 | FAMILY CELEBRATION |
| 005 | FIRST-RATE JAPANESE THIN WHEAT NOODLES GIFT SET | 5000 | 2 | 10000 | SEASON'S GREETING |
|  |  |  |  |  |  |
|  |  |  |  |  |  |
|  |  |  |  |  |  |

| TOTAL MONEY AMOUNT | 25000 |
|---|---|

FIG. 16

FORM DATA TABLE 196

| Label | Value | 1222 |
|---|---|---|
| 1203 | 1357 | |
| 1204 | YAMADA TARO | 0 |
| 1205 | 890 KASHIMADA SAIWAI-KU, KAWASAKI-SHI | 0 |
| 1205 | 1997, 10, 3 | 0 |
| 1207 | 001-549-1703 | 0 |
| 1208 | 1234-567890 | 1 |
| 1209 | 001 | 0 |
| 1210 | TOWEL GIFT SET | 0 |
| 1211 | 3000 | 0 |
| 1213 | 5 | 1 |
| 1213 | 15000 | 1 |
| 1214 | FAMILY CELEBRATION | 0 |
| 1215 | 005 | 0 |
| 1216 | FIRST-RATE JAPANESE THIN WHEAT NOODLES GIFT SET | 0 |
| 1217 | 5000 | 0 |
| 1218 | 2 | 1 |
| 1219 | 10000 | 1 |
| 1220 | SEASON'S GREETING | 0 |
| 1221 | 25000 | 1 |

FIG. 18

PURCHASE ORDER FORM

| CUSTOMER NAME | YAMADA TARO |
| --- | --- |
| ADDRESS | 890 KASHIMADA, SAIWAI-KU, KAWASAKI-SHI |

| PURCHASE DATE | 1997, 10, 3 |
| --- | --- |
| MEMBERSHIP NUMBER | 001-549-1703 |

| COMMODITY NUMBER | TRADE NAME | UNIT COST | REMARK |
| --- | --- | --- | --- |
| 001 | TOWEL GIFT SET | 3000 | FAMILY CELEBRATION |
| 005 | FIRST-RATE JAPANESE THIN WHEAT NOODLES GIFT SET | 5000 | SEASON'S GREETING |
| | | | |
| | | | |

FIG. 22

PURCHASE ORDER FORM — 2300

| CUSTOMER NAME | YAMADA TARO |
|---|---|
| ADDRESS | 890 KASHIMADA, SAIWAI-KU, KAWASAKI- SHI |

| PURCHASE DATE | 1997, 10, 3 |
|---|---|
| MEMBERSHIP NUMBER | 001-549-1703 |
| PAYMENT CREDIT CARD NUMBER | 1234-567890 |

| COMMODITY NUMBER | TRADE NAME | UNIT COST | QUANTITY | MONEY AMOUNT | REMARK |
|---|---|---|---|---|---|
| 001 | TOWEL GIFT SET | 3000 | 5 | 15000 | FAMILY CELEBRATION |
| 005 | FIRST-RATE JAPANESE THIN WHEAT NOODLES GIFT SET | 5000 | 2 | 10000 | SEASON'S GREETING |
|  |  |  |  |  |  |
|  |  |  |  |  |  |
|  |  |  |  |  |  |

| TOTAL MONEY AMOUNT | 25000 |
|---|---|

METHOD OF AND SYSTEM FOR PROCESSING ELECTRONIC DOCUMENT AND RECORDING MEDIUM FOR RECORDING PROCESSING PROGRAM

CROSS-REFERENCE TO RELATED APPLICATIONS

This invention relates to a patent application Ser. No. 08/652,089 entitled "METHOD OF CONTROLLING WORKFLOW SYSTEM" and filed by M. MINOYA et al. on May 23, 1996.

BACKGROUND OF THE INVENTION

The present invention relates to an electronic document circulation system for creating, circulating or processing an electronic document or form, and particularly to an effective electronic workflow control technology within a company or companies or an entity or entities or among any connection of them for use in an electronic circulation system for processing an electronic document or form over a plurality of workers distributed under the network circumstances.

W. Ford et al. "SECURE ELECTRONIC COMMERCE, PRENTICE HALL PTR, pp. 111–117 and pp. 167–169, JP-A-8-329151 and JP-A-7-182431 describe Secure Socket Layers, Secure-HTTP, digital signature or stamp, encryption, decryption and workflow network.

Data containing documents and forms which are circulated within a conventional workflow system of a company or companies or individuals or individual and company encounters with a risk of unauthorized alteration during it is sequentially processed by respective workers.

According to the on-line shopping using WWW (World Wide Web), purchasers are able to select desired goods while watching a worldwide home page introducing goods at a desired time in the home and to apply for the selected goods by an electronic mail on the internet by inputting trade names and number of selected goods into an electronic form which is referred to as "basket" or the like.

It is ideal to pay for the selected goods by using a credit card in a so-called cashless payment manner. However, if information such as credit card number were transmitted over the internet, such credit card number would have been abused by those who monitored the credit card number. Therefore, at present, credit card information is transmitted to the called party by other means such as Fax (facsimile).

In order to solve the problem of such inconvenient situations, as a tool in which an encryption function is assembled into WWW, authentication technologies and encryption technologies are applied to Secure Socket Layer (SSL). These technologies are effective as countermeasures such as "Real called party?", "Communication contents are difficult to read", "communication contents cannot be altered" for solving the problems of "masquerade", "monitoring" and "unauthorized alteration".

The SSL is one of encryption protocols and is able to encrypt all contents communicated via a Transmission Control Protocol/Internet Protocol (TCP/IP). Therefore, the SSL can cope with a variety of communication protocols such as Hyper Text Transfer Protocol (HTTP) for watching a home page, Simple Mail Transfer Protocol (SMTP) and Post Office Protocol (POP) for reading an electronic mail. In the case of WWW browser, it is possible to visually confirm from a picture by the display of a key mark whether or not a worker is authenticated correctly.

An electronic document comprises a plurality of tables and character strings (hereinafter referred to as formats) and data of each cell within the table (hereinafter referred to as data). In most cases, there is defined a calculation method of calculating data within a specific cell with reference to data of other cells except cells formed of data.

SUMMARY OF THE INVENTION

It is an object of the present invention to provide a technology in which a time necessary for encrypting and decrypting data such as electronic document and slip may be reduced and encrypted data may be displayed for only a specific worker.

It is another object of the present invention to provide a workflow system in which respective workers who check and process a plurality of divided data blocks within a document are inhibited from monitoring their checked/processed data blocks with each other.

It is other object of the present invention to provide a technology in which a displayed state of specific data may be controlled in response to an authorized duty of each worker.

It is a further object of the present invention to provide a technology in which the number of steps used to define a format for displaying electronic data may be reduced and electronic data may be displayed at high speed.

According to a first aspect of the present invention, there is provided a document circulation method of circulating a document having a plurality of data blocks. This circulation method comprises the steps of encrypting a certain data block of a plurality of data blocks in a document by using an encrypting key corresponding to a certain worker, encrypting another data block of a plurality of data blocks in the document by using another encrypting key corresponding to another worker and circulating the document having the certain data block and another data block over a network.

According to a second aspect of the present invention, there is provided a document circulation system for circulating a document having a plurality of data blocks. This document circulation system comprises an encrypting unit for encrypting a certain data block of a plurality of data blocks of a document by using an encrypting key corresponding to a certain worker and encrypting another data block of a plurality of data blocks of a document by using another encrypting key corresponding to another worker and a first apparatus having a transmitting unit for circulating the document having a certain data block and another data block through a network.

According to a third aspect of the present invention, there is provided a document circulation apparatus for circulating a document having a plurality of data blocks. This document circulation apparatus comprises an encrypting unit for encrypting a certain data block of a plurality of data blocks of a document by using an encrypting key corresponding to a certain worker and encrypting another data block of a plurality of data blocks of the document by using another encrypting key corresponding to another worker, a transmitting and receiving unit for circulating the document having a certain data block and another data block over a network and a display control unit for decrypting an encrypted portion of a document received from the network by using its own decrypting key and setting a display condition such that a data block which cannot be decrypted is not displayed.

According to a fourth aspect of the present invention, there is provided a storage medium for recording a document circulation program for circulating a document having a plurality of data blocks in such a manner that the document circulation program can be read by a computer. This storage medium comprises a code for the step of encrypting a certain data block of a plurality of data blocks of a document by using an encrypting key corresponding to a certain worker and encrypting another data block of a plurality of data blocks of the document by using an encrypting key corresponding to another worker and a code for the step of circulating the document having a certain data block and another data block over a network.

In accordance with a fifth aspect of the present invention, there is provided a storage medium for recording a document circulation program for circulating a document having a plurality of data blocks in such a manner that the document circulation program can be read by a computer. This storage medium comprises a code for the step of decrypting an encrypted portion of the document received from the network by using its own decrypting key and displaying the document except a data block which cannot be decrypted.

In accordance with a sixth aspect of the present invention, there is provided an electronic document processing method for circulating an electronic document having a plurality of data groups over a plurality of workers. This electronic document processing method comprises the steps of encrypting a certain data group of a plurality of data in an electronic document by using an encrypting key corresponding to a certain worker, transmitting an electronic document having the encrypted data group over a network, decrypting the encrypted data group of the electronic document by using a decrypting key corresponding to the worker and displaying whether or not the encrypted data group is decrypted correctly or displaying the document in response to the existence of the data group.

In accordance with a seventh aspect of the present invention, there is provided an electronic document processing system for circulating an electronic document having a plurality of data through a plurality of workers. This electronic document processing system comprises a first apparatus including a data encryption processing unit for encrypting a certain data of a plurality of data in an electronic document by using an encrypting key corresponding to a certain worker and a data input and output processing unit for transmitting and outputting an electronic document having the encrypted data over a network and a second apparatus including a data decryption processing unit for decrypting the encrypted data in the electronic document by using a decrypting key corresponding to the worker and a process defining and executing processing unit for displaying the data and effecting a processing in response to whether or not the encrypted specific form data is decrypted correctly or the existence of the form data.

In accordance with an eighth aspect of the present invention, there is provided a medium in which a program for enabling a computer to function as an electronic document processing system for circulating an electronic document having a plurality of data through a plurality of workers may be recorded in such a manner that the medium may be read and executed by a computer. This medium records programs for functioning a computer as a data encryption processing unit for encrypting specific data of a plurality of data in an electronic document by using an encrypting key corresponding to a specific worker, a data input and output processing unit for transmitting and receiving electronic data having the encrypted specific data over a network, data decryption processing unit for decrypting the encrypted specific data in the electronic data by a decrypting key corresponding to the specific worker, and a process defining and executing processing unit for displaying data and effecting a processing in response to whether or not the encrypted data is decoded correctly or the existence of the data.

In an electronic data circulation processing system in which an electronic document having a plurality of data are circulated to a plurality of workers, an electronic document in which specific data within a plurality of data is encrypted by an encrypting key corresponding to a specific worker is circulated among a plurality of workers, the encrypted data are decrypted by using a decrypting key of each worker, an electronic document including decrypted data is displayed and processed electronically.

In an electronic document processing system according to the present invention, specific data within a plurality of data within electronic document data is encrypted by using an encrypting key corresponding to a specific worker and electronic document data having the specific encrypted data is transmitted to another worker over the network.

The worker who received the electronic document having the encrypted data decrypts encrypted data within the electronic document by using a decrypting key of that worker.

If the worker who received the electronic document has a decrypting key corresponding to the encrypting key used in the encryption, encrypted data can be decrypted correctly. If not, then encrypted data cannot be decrypted.

When the encrypted specific data is decrypted correctly, the contents of the electronic document including decrypted data are displayed and the processing corresponding to the worker is executed.

When the encrypted specific data is not ecrypted correctly, under the condition that the display of encrypted data and the display of a cell which becomes a display frame used to display such data are restrained, electronic data is displayed and the processing corresponding to the worker is executed. At that time, the display of cells in which original data are not stored may be restrained.

Further, if a decrypting key is distributed to each worker in response to an authorized duty of each worker, then only a worker who has an authorized duty for referring to the data may refer to such data.

Furthermore, if information indicative of a display attribute of each data is set in a format, a display attribute of a format is changed in response to whether or not the encrypted specific data is decrypted correctly or the existence of the data and the display of the data and the display of such cell are restrained, then a plurality of formats need not be prepared in response to respective workers, and data may be displayed with a different format for every worker.

As described above, according to the electronic document processing system of the present invention, since specific data within a plurality of data in an electronic document is encrypted and decrypted by using the encrypting and decrypting keys corresponding to a specific worker, a time necessary for encrypting and decrypting the electronic document may be reduced, and encrypted data may be displayed for only a specific worker.

BRIEF DESCRIPTION OF THE DRAWINGS

FIG. 4 is a schematic diagram showing an electronic form processing apparatus 3 according to an embodiment of the present invention;

FIG. 7 is a diagram showing an example of an electronic form according to an embodiment of the present invention;

FIG. 10 is a diagram showing a data structure of an electronic form format file 470 according to an embodiment of the present invention;

FIG. 15 is a diagram showing an example of a picture obtained after form data was inputted according to an embodiment of the present invention;

FIG. 16 is a diagram showing the state of a form data table 196 on a main memory 139 according to an embodiment of the present invention

FIG. 18 is a diagram showing an example of a picture of a window obtained when the worker B makes a check according to an embodiment of the present invention;

FIG. 22 is a diagram showing an example of a picture of a window obtained when a worker C makes a processing according to an embodiment of the present invention.

DESCRIPTION OF THE PREFERRED EMBODIMENT

An electronic document processing system in which an electronic form having a plurality of form data is circulated to a plurality of workers according to an embodiment of the present invention will hereinafter be described with reference to the drawings.

Figure 1:
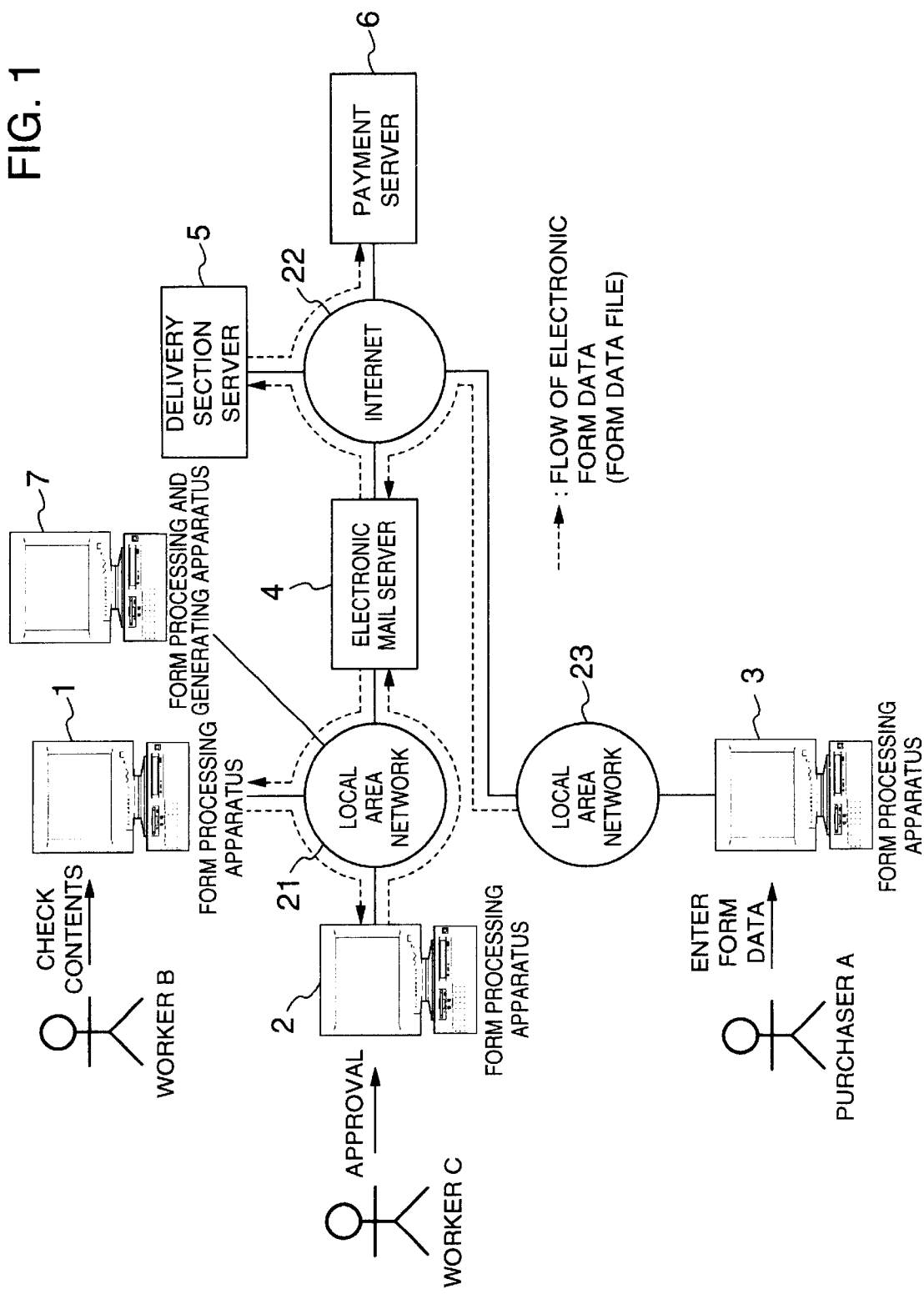
FIG. 1 is a schematic diagram showing an electronic form processing system according to an embodiment of the present invention.

FIG. 1 of the accompanying drawings is a schematic diagram showing an electronic document processing system according to an embodiment of the present invention. As shown in FIG. 1, the electronic document processing system includes a form processing apparatus 1, a form processing apparatus 2, a form processing apparatus 3, an electronic mall server 4, a delivery section server 5, a payment server 6 and a form processing and generating apparatus 7.

The form processing apparatus 1 checks inputted contents of form data which may be referred to by a worker B, and transmits the electronic form thus checked to a worker C. The form processing apparatus 2 supplies the electronic form to the delivery section server 5 if the contents of the electronic form are approved by the worker C.

The form processing apparatus 3 is used by a worker or a purchaser A to input form data of necessary items to the electronic form, which is a purchase application form, and transmits the electronic form to the worker B who purchases goods via an electronic mail. The electronic mall server 4 is adapted to purchase goods by utilizing an internet 22.

The delivery section server 5 is adapted to deliver purchased goods. The payment server 6 is adapted to approve the payment of the worker or purchaser A and to store form data of the electronic forms issued by the purchaser A. The form processing and generating apparatus 7 is adapted to execute a key generating processing and a form definition processing.

A local area network (LAN) 21 is a network for connecting the form processing apparatus 1, the form processing apparatus 2, the form processing and generating apparatus 7 and the electronic mall server 4. The internet 22 is a network for connecting then electronic mall server 4, the delivery section server 5, the payment server 5 and a local area network (LAN) 23. The local area network 23 is a network for connecting the form processing apparatus 3 and the internet 22.

The electronic document processing system according to this embodiment comprises more than one (three processing apparatus in this embodiment) processing apparatus for processing the electronic form, i.e. the form processing apparatus 1, the form processing apparatus 2 and the form processing apparatus 3, the electronic mall server 4, the delivery section server 5, the payment server 6 and the form processing and generating apparatus 7, and these apparatus are physically connected via the network. Under these circumstances, a plurality of workers circulate the electronic form, input form data, check inputted form data and examine/approve the contents of inputted form data.

In the electronic document system according to this embodiment, when a worker executes an online-shopping by using the internet 22, initially, the worker or the purchaser A enters form data into an electronic form serving as an application form as necessary items through the form processing apparatus 3, and sends the electronic form to the worker B who sells goods via the electronic mail.

After the worker B checks the inputted contents of the form data that can be referred to by the form processing apparatus 1, and sends the electronic form to the worker C. The worker C approves the electronic form by the form processing apparatus 2, and sends the electronic form to the delivery section server 5 of goods if the contents of the electronic form are approved. At the completion of the delivery processing, the electronic form is sent to the payment server 6 and accumulated in the database of the payment server 6.

In the electronic document system according to this embodiment, one or a plurality of item groups contained in the form data received by each worker are encrypted. A private key for decrypting the encrypted form data is distributed to each worker in response to a worker's authorized duty, and an electronic form format that should be displayed on the screen becomes different depending upon whether or not the worker has the private key.

Figure 2:
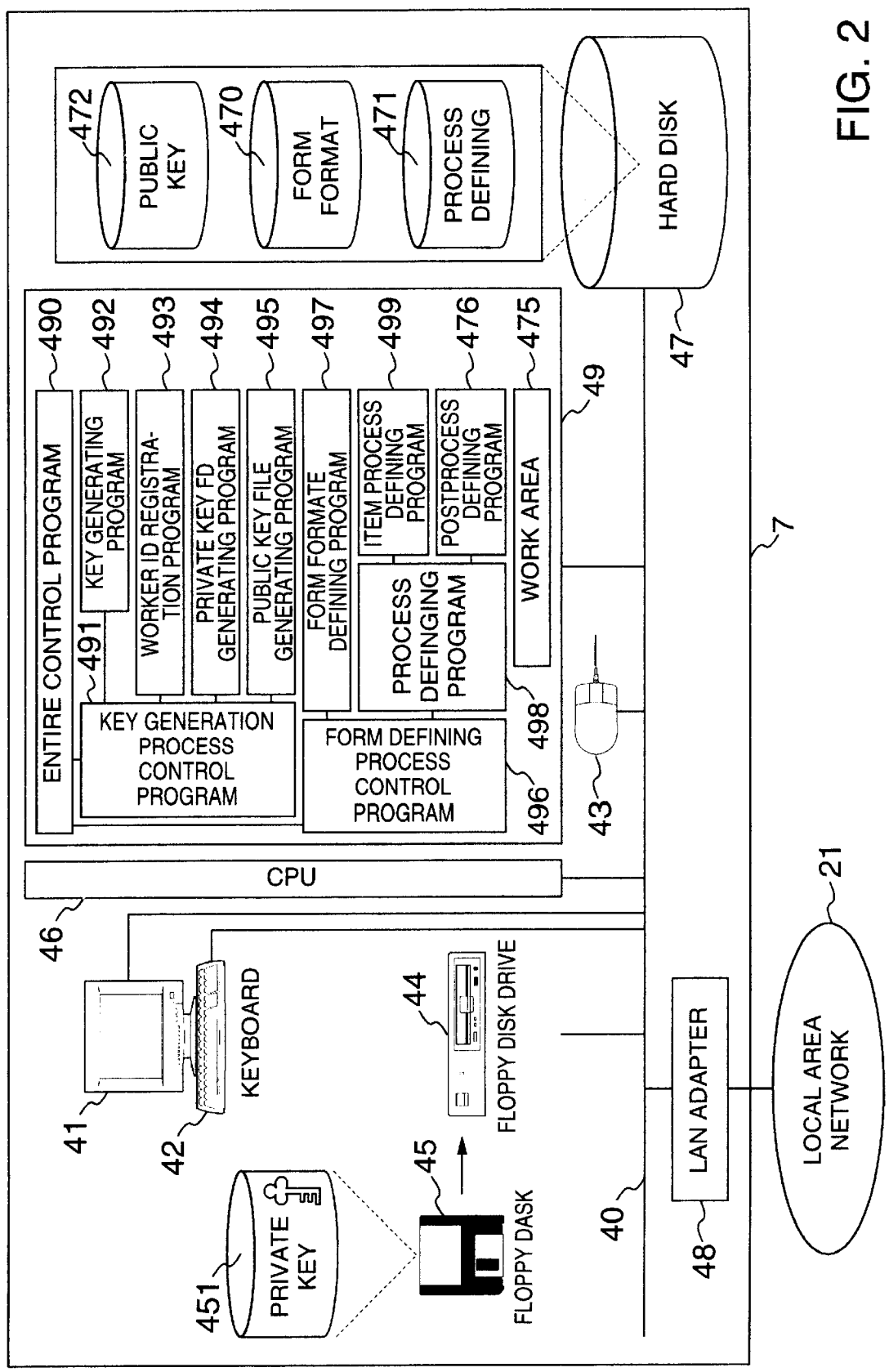
FIG. 2 is a schematic diagram showing an electronic form processing and generating apparatus 7 according to an embodiment of the present invention.

FIG. 2 is a schematic arrangement showing the form processing and generating apparatus 7 for defining a document or form format and its processing procedure according to this embodiment. As shown in FIG. 2, the form processing and generating apparatus 7 according to this embodiment includes a CPU 46 (central processing unit) 46, a main memory 49, a display 41, a keyboard 42, a mouse 43, a floppy disk drive 44, a floppy disk 45, a hard disk 47, a LAN adapter 48, a bus 40, a private key file 451, a form format file 470, a processing definition file 471, a public key file 472 and a work area 475.

The CPU 46 is a processing apparatus for controlling the whole operation of the form processing and generating apparatus 7. When the form processing and generating apparatus 7 defines a form format and a processing procedure, all of other apparatus and the network need not be connected together. The main memory 49 is a storage device for loading a variety of processing programs and data used to execute a suitable processing such as a key generation processing and a processing definition. The display 41 is a display device capable of displaying processed contents of the processing programs.

The keyboard 42 is an input device for executing an operation in accordance with the processing program and to enter data. The mouse 43 is a device capable of entering an instruction in accordance with the processing program. The floppy disk drive 44 is a device capable of writing the private key generated by a private key FD (floppy disk) generating program 494 in the floppy disk 45.

The floppy disk 45 is a storage medium in which there is stored the private key generated by the private key FD generating program. The hard disk 47 is an a storage device capable of temporarily storing at least the form format file 470 and the processing definition file 471 as defined results and is able to store the public key file 472 generated by the public key file generating program 495.

The LAN adapter 48 is an adapter for connecting the form processing and generating apparatus 7 to the local area network 21. The bus 40 is a signal line for connecting respective units such as the CPU 46 to each other. The private key file 451 is a file capable of storing a private key (decrypting key).

The form format file 470 is a file capable of storing a form format which is a format representing a layout required when an electronic form is outputted on the screen of the display 41 and a printer or the like. The processing definition file 471 is a file capable of storing the processing definition which defines the contents of the processing effected on the electronic form.

The public key file 472 is a file capable of storing the public key (encrypting key). The work area 475 is a work area capable of storing temporary data when the processing program is executed.

The form processing and generating apparatus 7 includes an entire control program 490, a key generating processing control program 491, a key generating program 492, a worker ID (identification) registration program 493, a private key FD (floppy disk) generating program 494, a public key file generating program 495, a form definition processing control program 496, a form format definition program 497, a process defining program 498, an item process defining program 499 and a postprocess defining program 476.

The entire control program 490 is a processing capable of controlling the entire operation of the key generating processing and the form defining processing. The key generating processing control program 491 is a process unit capable of controlling the whole of the key generating process for generating the private key and the public key.

The key generating program 492 is a processing unit capable of generating a pair of private key and public key based on a public-key cryptosystem. The worker ID (identification) registration program 493 is a processing unit capable of registering a worker ID number used to associate a pair of private key and public key with a worker.

The private key FD generating program 494 is a processing unit for generating the floppy disk 45 in which there is stored the private key. The public key file generating program file 495 is a processing unit for generating the pubic key file 472 in which the public key is stored.

The form definition processing control program 496 is a processing unit for generating a form format of an electronic form and its processing definition. The form format defining program 497 is a processing unit capable of defining a form format of an electronic form.

The process defining program 498 is a processing unit capable of controlling the definitions of the item processing and the postprocessing. The item process defining program 499 is a processing unit capable of defining the item processing used to calculate form data of respective items. The postprocessing defining program 476 is a processing unit capable of defining the contents of the item processing and the contents of the processing executed after form data was entered and which is used to designate specific form data of a plurality of form data in the electronic form as decrypted form data by using a public key corresponding to a specific worker.

The entire control program 490 for enabling the form processing and generating apparatus 7 to function as the above-mentioned respective processing units, the key generating processing control program 491, the key generating program 492, the worker ID registration program 493, the private key FD generating program 494, the public key file generating program 495, the form definition processing control program 496, the form format defining program 497, the process defining program 498, the item process defining program 499 and the postprocessing defining program 476 are recorded on a recording medium such as a CD-ROM (compact disc-read-only memory), stored in a magnetic disc, loaded onto a memory and then executed. A recording medium in which the above-mentioned programs are recorded is not limited to the CD-ROM, and other recording media may be used.

Figure 3:
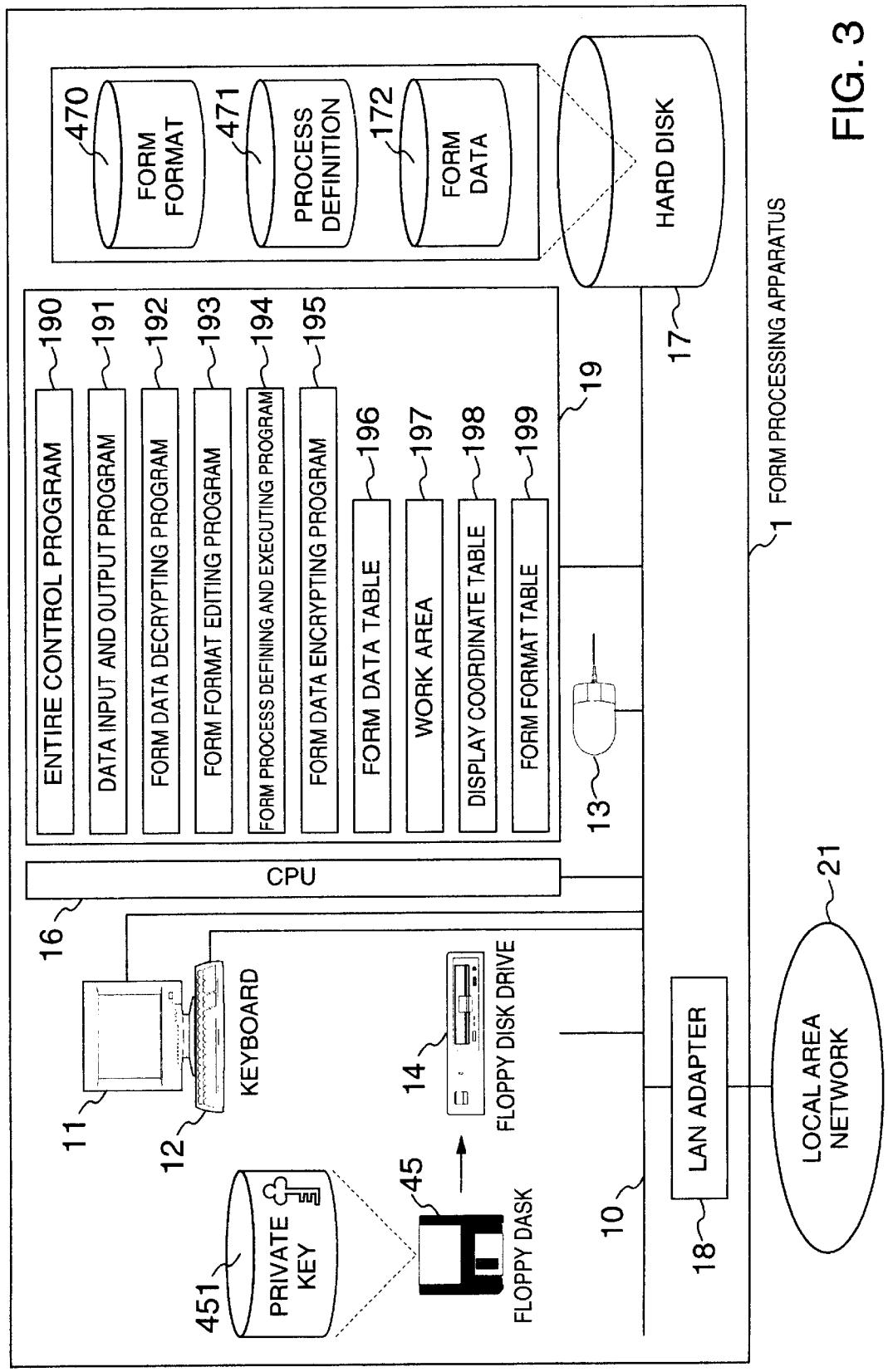
FIG. 3 is a schematic diagram showing an electronic form processing apparatus 1 according to an embodiment of the present invention.

FIG. 3 is a schematic diagram showing the form processing apparatus 1 according to this embodiment. As shown in FIG. 3, the form processing apparatus 1 according to this embodiment includes a CPU 16, a main memory 19, a display 11, a keyboard 12, a mouse 13, a floppy disk drive 14, a hard disk 17, a LAN adapter 18, a bus 10, a form data file 172, a form data table 196, a work area 197, a display coordinate table 198 and a form format table 199.

The CPU 16 is a processing unit capable of controlling the entire operation of the form processing apparatus 1. The main memory 19 is a storage device capable of loading a variety of processing programs and data which are used to encrypt and decrypt form data and to execute the contents of process definition.

The display 11 is a device capable of displaying processed contents of the processing program. The keyboard 12 is input device capable of executing an operation in accordance with the processing program and entering data. The mouse 13 is a device for inputting an instruction in accordance with the processing program.

The floppy disk drive 14 is a device capable of reading out a private key from the floppy disk 45. The hard disk 17 is a storage device capable of temporarily storing at least the form format file 470, the process defining file 471 and the form data file 172.

The LAN adapter 18 is an adapter capable of connecting the form processing apparatus 1 to the local area network 21. The bus 10 is a signal line for connecting the respective units such as the CPU 16 to each other. The form data file 172 is a file capable of storing form data in the electronic form.

The form data table 196 is a table capable of storing form data in the form data file 172. The work area 197 is a work area capable of storing temporary data when the processing program is executed. The display coordinate table 198 is an edit work area capable of display coordinates of form data when the form format edit program 193 edits the form format table 199 with reference to the form data table 196. The form format table 199 is a table capable of storing a form format in the form format file 470.

The form processing apparatus 1 includes an entire control program 190, a data input and output program 191, a form data decryption program 192, a form format edit program 193, a form process defining and executing program 194 and a form data encryption program 195.

The entire control program 190 is a processing unit capable of operations of the whole processing such as encryption and decryption of form data and execution of the contents of the process defining. The data input and output program 191 is a processing unit capable of writing the contents of the form format file 470, the process defining file 471 and the form data file 172 in the form format table 199, the work area 197 and the form data table 196 and transmitting and receiving an electronic form having specific encrypted form data through the network.

The form data decryption program 192 is a processing unit capable of decrypting specific encrypted data in the electronic form by using a private key corresponding to a specific worker. The form format edit program 193 is a processing unit capable of editing a form format in the form format table 199 in response to whether or not specific encrypted data is decrypted correctly.

The form process defining and executing program 194 is a processing unit capable of executing a processing defined as an item processing of the process defining file 471 and displaying the contents of the form format table 199 and the form data table 196 on the display 11 of the form processing apparatus 1 as an electronic form. The form data decryption program 195 is a processing unit for decrypting specific form data of the form data table 196 by using a public key corresponding to a specific worker in accordance with the contents of the process defining file 471.

The entire control program 190 for enabling the form processing apparatus 1 to function as the respective processing units, the data input and output program 191, the form data decryption program 192, the form format edit program 193, the form process defining and executing program 194 and the form data encryption program 195 are recorded on a recording medium such as a CD-ROM, stored in a magnetic disk, loaded onto a memory and then executed. Incidentally, the recording medium for recording the above-mentioned programs is not limited to the CD-ROM, and other recording media may be used.

The form processing apparatus 1 includes the hardware necessary for circulating an electronic form, and the form processing apparatus 2 has an arrangement similar to that of the form processing apparatus 1.

The main memory 19 has loaded thereon the entire control program 190, the data input and output program 191, the form data decryption program 192, the form format edit program 193, the form process defining and executing program 194 and the form data encryption program 195, and maintains areas of the form data table 196, the work area 197, the display coordinate table 198 and the form format table 199.

The floppy disk 45 is a medium storage capable of recording the private key file 451 in which a private key is stored. The private key is read in the work area 197 of the main memory 19 through the floppy disk drive 14.

In the form processing apparatus 1, when a worker instructs the execution of work by the keyboard 12 or the mouse 13, the entire control program 190 activates the data input and output program 191 so that the form format file 470 on the hard disk 17 is read in the form format table 199, the process defining file 471 is read in the work area 197 and the contents of the form data file 172 are read in the form data table 196, respectively.

Then, the entire control program 190 activates the form data decryption program 192. When form data of the form data table 196 is encrypted, the form data decryption program 192 decrypts form data with reference to the private key file 451 of the work area 197 if the encrypted form data may be decrypted.

The form format edit program 193 edits the form format table 199 by using the display coordinate table 198 as the edit work area with reference to the form data table 196.

Then, the entire control program 190 activates the form process defining and executing program 194 to display the contents of the electronic form on the display 11 with reference to the form format table 199.

A worker checks and approves the inputted contents. When the end of the check and the approval of the inputted contents is instructed, the worker activates the form data encryption program 195 to encrypt a group of specific form data of the form data table 196 by using a public key in accordance with the contents of the process defining file 471, and sends the form data table 196 through the LAN adapter 18 to a designated mail address. Incidentally, the LAN adapter 18 is connected through the local area network 21 to the internet 22.

FIG. 4 is a schematic diagram showing the form processing apparatus 3 according to this embodiment. As shown in FIG. 4, the form processing apparatus 3 according to this embodiment includes a CPU 136, a main memory 139, a display 131, a keyboard 132, a mouse 133, a hard disk 137, a LAN adapter 138 and a bus 130.

The CPU 136 is a processing unit capable of controlling the whole operation of the form processing apparatus 3. The main memory 139 is a storage device capable of loading a variety of processing programs and data for encrypting form data and executing the contents of the process defining. The display 131 is a device capable of displaying the processed contents of the processing program.

The keyboard 132 is a device capable of executing an operation and entering data in accordance with the processing program. The mouse 133 is a device capable of inputting an instruction in accordance with the processing program. The hard disk 137 is a storage device capable of temporarily storing the form format file 470 and the process defining file 471.

The LAN adapter 138 is an adapter capable of connecting the form processing apparatus 3 to the local area network 23. The bus 130 is a signal line for connecting respective units such as the CPU 136 to each other.

The main memory 139 has loaded thereon the entire control program 190, the data input and output program 191, the form process defining and executing program 194 and the form data encryption program 195, and maintains areas of the work area 197, the form data table 196 and the form format table 199.

When the purchaser A instructs the execution of the work through the keyboard 132, the entire control program 190 activates the data input and output program 191 to read the form format file 470 on the hard disk 137 into the form format table 199 and to read the process defining file 471 into the work area 197.

Then, the entire control program 190 activates the form process defining and executing program 194 to display the contents of the electronic form on the display 131 with reference to the form format table 199. When form data is inputted through the keyboard 132, the form data is processed in accordance with the contents of the process defining file 417, and a processed result is temporarily stored in the form data table 196.

When the purchaser A instructs the end of entering the form data, the entire control program 190 activates the form data encryption program 195 to encrypt specific form data of the form data table 196 by using a public key in accordance with the contents of the process defining file 471. Then, the form data table 196 is sent through the LAN adapter 138 to a designated mail address. Incidentally, the LAN adapter 138 is connected through the local area network 23 to the internet 22.

The manner in which form data is encrypted and decrypted in the electronic document processing system according to this embodiment will be described next. The encryption and the decryption of form data use a public-key cryptosystem algorithm which uses different keys for encrypting and decrypting form data. In this public-key cryptosystem algorithm, there are used a pair of a private key and a public key, and form data encrypted by the public key can be decrypted only by a corresponding private key.

Figure 5A:
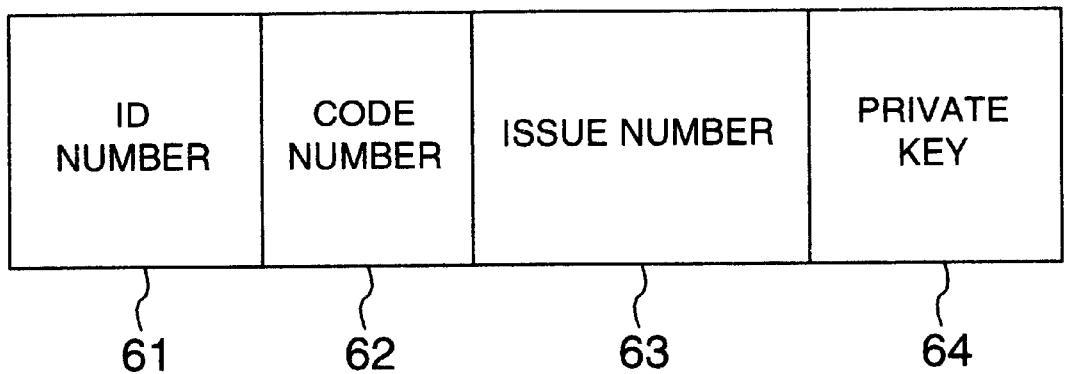
FIG. 5A is a diagram showing an outline of a private key 451 according to an embodiment of the present invention.
Figure 5B:
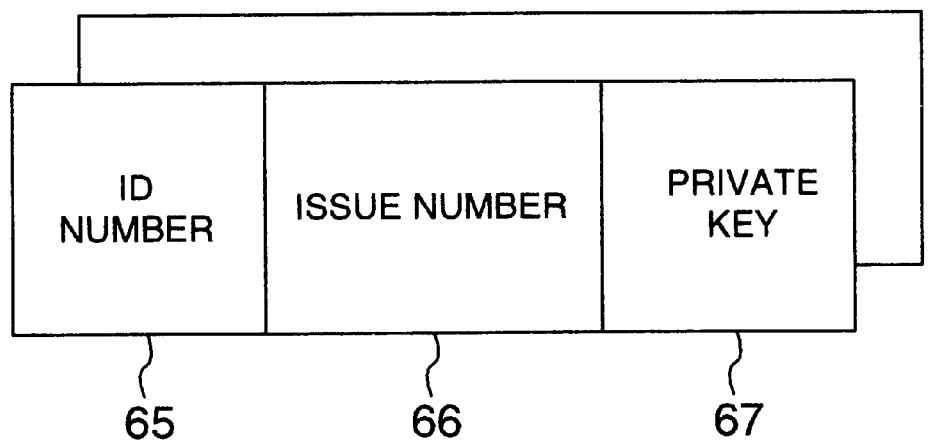
FIG. 5B is a diagram showing an outline of a public key 472 according to an embodiment of the present invention.

FIGS. 5A and 5B are schematic diagrams showing the private key file 451 and the public key file 472 according to this embodiment. As shown in FIG. 5A, the private key file 451 according to this embodiment includes an ID number 61, a password 62, an issue number 63 and a private key 64.

The ID number 61 is a number used to identify a worker. The password 62 is a number used to confirm the worker in person. The issue number 63 is a number used to identify the issued private key 64. The private key 64 is a key used to decrypt encrypted form data.

The public key file 472 shown in FIG. 5B includes an ID number 65, an issue number 66 and a public key 67. The ID number 65 is a number used to identify a worker. The issue number 66 is a number used to identify the issued public key 67. The public key 67 is a key used to encrypt specific form data.

The private key file 451 stores the ID number 61, the password 62, the issue number 63 and the private key 64 of the worker. The public key 472 stores the ID number 65, the issue number 66 and the public key 67 of the worker. A corresponding relationship between the private key 64 and the public key 67 is managed by the ID number 61 and the ID number 65 of the worker.

Figure 6:
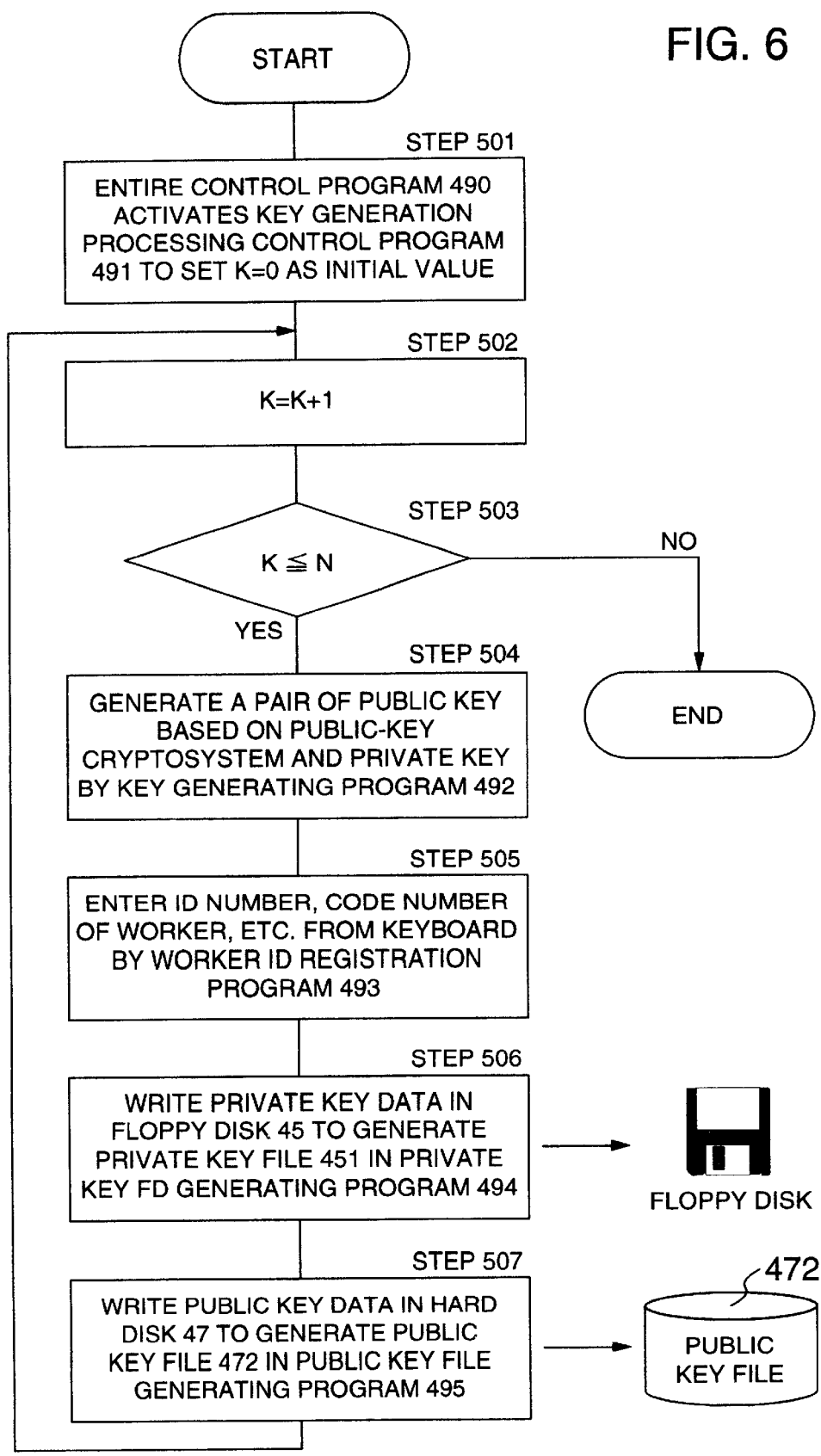
FIG. 6 is a flowchart showing a procedure of generating keys according to an embodiment of the present invention.

FIG. 6 is a flowchart showing the procedure of the key generating processing according to this embodiment. The manner in which the private key 64 and the public key 67 are generated will be described with reference to the flowchart of FIG. 6. In this case, let it be assumed that N keys are generated.

Referring to FIG. 6, and following the start of operation, when receiving a key generating instruction from an originator, at step 501, the entire control program 490 activates the key generating processing control program 491, and the key generating processing control program 491 sets a program counter K provided within the work area 475 to "0".

At step 502, the key generating processing control program 491 adds "1" to K and counts the issue number 63. In the next decision step 503, the value of K and the value of N are compared with each other by the key generating processing control program 491. If $K \leq N$ as represented by a YES at the decision step 503, then control goes to step 504 and the following steps are executed. If a NO is outputted at the decision step 503, then control is ended.

In step 504, the key generating processing control program 491 generates a pair of the private key 64 and the public key 67 based on the public-key cryptosystem by using the key generating program 492, and stores the pair of the private key 64 and the public key 67 thus generated in the work area 475.

The pair of the public key 67 and the private key 64 are obtained by a suitable method such as generating two large integers which are mutually prime.

In step 505, the key generating processing control program 491 executes the worker ID registration program 493, and stores the ID number 61 and the password 62 of the target worker entered by the originator from the keyboard 42 in the work area 475. In this case, although it is assumed that the originator learns the password 62 from the worker in advance, the worker may enter the password 62 directly.

In step 506, the key generating processing control program 491 executes the private key FD generating program 494 to write the ID number 61 representing one worker, the password 62 of that person, the issue number 63 and the private key 64 based on the public-key cryptosystem in the private key file 451 within the private key storing floppy disk 45 newly loaded by the originator by using data stored in the work area 475.

In step 507, the key generating processing control program 491 executes the public key file generating program 495 to write the ID number 65, the issue number 66 and the public key 67 in the public key file 472 within the hard disk 47 by using data stored in the work area 475.

When the key generating processing control program 491 repeats the steps 502 to 507 N times (all workers), the contents shown in the private key file 451 shown in FIG. 5A and the public key file 472 shown in FIG. 5B are stored in the floppy disk 45 and the hard disk 47.

The floppy disk 45 which stores the private key 64 for decrypting form data is distributed in advance to the worker in response to the authorized duty before work is started. Here, let it be assumed that different private keys 64 in the form of the private key file 451 are distributed to the worker C and the payment server 6 and that the public keys 67 corresponding to at lease the two private keys 64 are respectively stored in the public key file 472 of the electronic mall server 4.

FIG. 7 is a diagram showing an example of an electronic form according to this embodiment. As shown in FIG. 7, an electronic form 30 according to this embodiment includes a customer name 31, a purchase order date 32, a membership number 33, a customer address 34, a payment credit card number 35, a total money amount 36, a detail portion 37, a form title character area 38, a commodity number 371, a trade name 372, a unit cost 373, a quantity 374, an amount of money 375 and a remark 376.

The customer name is form data representing a name of a purchaser. The purchase order date 32 is form data representing a date at which a commodity is purchased. The membership number 33 is form data representing a number which is used to identify a member who is a purchaser.

The customer address 34 is form data representing an address of a purchaser. The payment credit card number 35 is form data representing a credit card number which makes a payment. The total money amount 36 is form data representing a total price of purchased commodities.

The detail portion 37 is form data representing details of the contents of the purchasing application form. The form title character area 38 is an area used to display a character string representing the title of the electronic form 30. The commodity number 371 is form data representing the purchased commodity number.

The trade name 372 is form data representing a title of a purchased commodity. The unit cost 373 is form data representing a unit price of a purchased commodity. The quantity is form data representing the quantity of purchased commodities. The amount of money 375 is form data representing a subtotal of every purchased commodity. The remark 376 is form data representing other information concerning the purchased commodity. A method of generating the electronic form 30 shown in FIG. 7 will be described next.

Figure 8:
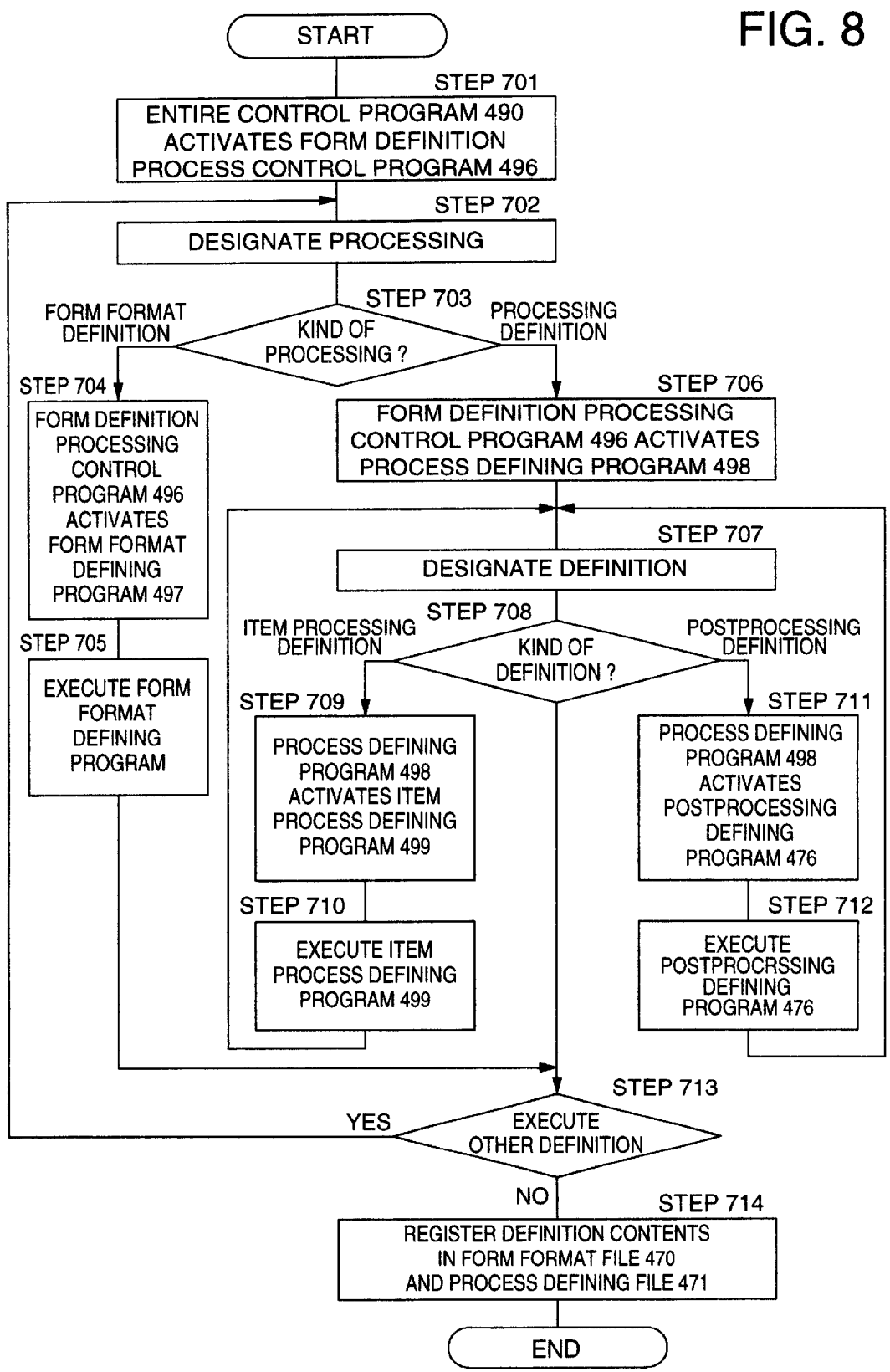
FIG. 8 is a flowchart showing a procedure of making an electronic form 30 according to an embodiment of the present invention.

FIG. 8 is a flowchart showing a procedure of generating the electronic form 30 according to this embodiment.

Referring to FIG. 8 and following the start of operation, i.e. when the originator instructs the activation of the form defining processing control program 496 during the entire control program 490 is activated, in step 701, there is activated the form defining processing control program 496 which defines the form format indicative of the layout on the screen and the processing definition which describes the method of processing form data.

In step 702, there is designated a kind of defined processing. In the next decision step 703, if it is determined whether the form format definition is designated. If the form format definition is designated, then control goes to step 704, whereat the form defining processing control program 496 activates the form format defining program 497. In the next step 705, the form format is defined by executing the form format defining program 497.

Incidentally, the form format comprises cell information concerning cell display position, cell display area and attribute for displaying form data and layout information for decorating a form.

In the decision step 703, if it is determined that the processing definition is selected, control goes to step 706, whereat the form defining processing control program 496 activates the process defining program 498. The process definition defines the contents of the processing executed when the electronic form 30 is received, and is stored in the process defining file 471.

In step 707, the kind of the processing definition is inputted, and the item processing indicative of a method of calculating form data of respective items and the postprocessing indicative of a processing method executed after a form data input end instruction was issued are designated.

If the item processing definition is designated at decision step 708, then control goes to step 709, wherein the process defining program 498 activates the item process defining program 499. In the next step 710, the item processing definition is executed by executing the item process defining program 499.

If on the other hand the postprocessing definition is designated at the decision step 708, then control goes to a step 711, whereat the process defining program 498 activates the postprocessing defining program 476. In the next step 712, the postprocessing definition is executed by executing the postprocessing defining program 476.

If there is an instruction for executing other definition after step 705, step 710 or step 712 was ended, then control goes back from step 713 to step 702. If all definitions are ended, then control goes to step 714, whereat the previously-defined contents are registered in the form format file 470 or the process defining file 471, and the processing is ended.

Then, the processing executed by the form format defining program 497 at the step 705 will be described. In the form format defining program 497, cell position, cell area and character string are inputted on the screen by using the mouse 43 and the keyboard 42. The cell position, the cell area and the character string may be defined by an operation method similar to that of an ordinary drawing software.

Figure 9:
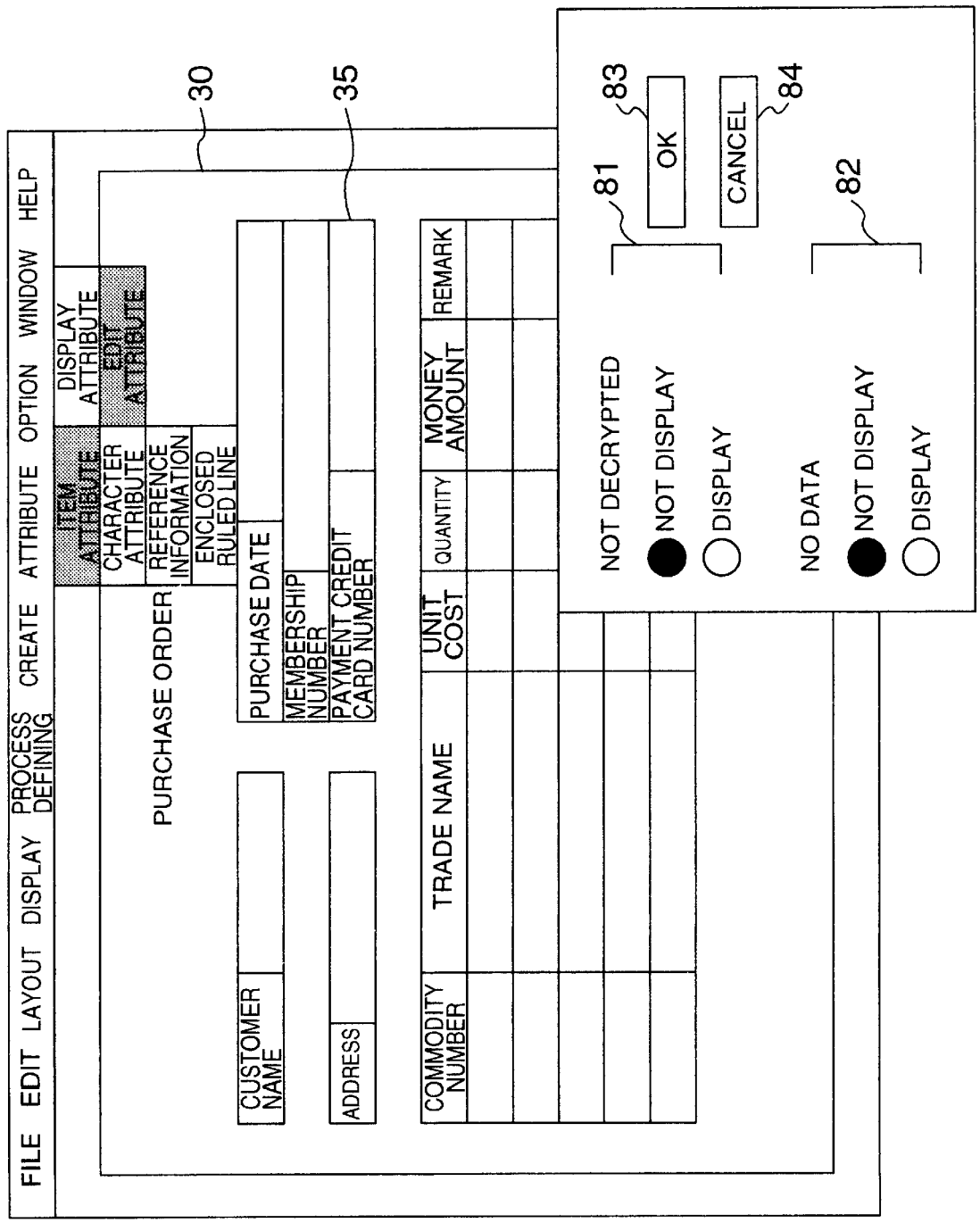
FIG. 9 is a diagram showing a picture in which cell attributes are defined according to an embodiment of the present invention.

When the form processing is executed, if form data is encrypted or there is no form data, then whether or not the cell should be displayed is defined as a cell attribute. FIG. 9 shows an example of a picture on which a cell attribute is displayed.

FIG. 9 is a diagram showing an example of a cell attribute defining picture displayed on the screen according to this embodiment. As shown in FIG. 9, the cell attribute defining picture according to this embodiment includes a dialog 80, cell information 81, 82, an OK button 83, a cancel button 84 and a selection menu 85.

The dialog 80 is a picture for setting the contents of the cell information 81 and 82. The cell information 81 and 82 are information for setting whether or not the cell should be displayed. The OK button 83 is a button for changing the setting to the contents selected by the cell information 81 and 82.

The cancel button 84 is a button for canceling the change of the setting to the contents selected by the cell information 81 and 82. The selection menu 85 is a menu for selecting the processing which defines the item attribute.

As shown in FIG. 9, after a specific cell, e.g. cell such as the payment credit card number 35 was selected, if command [attribute]–[item attribute]–[edit attribute] is selected by the selection menu 85, then there is displayed the dialog 80 on the screen.

The cell information 81 indicates whether or not the cell should be displayed when encrypted form data cannot be decrypted because of having a correct key. In FIG. 9, "NOT DISPLAY" is selected as shown by a solid circle. The cell information 82 determines whether or not the cell should be displayed when there is no form data in the cell.

In FIG. 9, "NOT DISPLAY" is selected as shown by a solid circle. If "DISPLAY" is selected instead, then a blank data column will be displayed.

When the cell attribute of the contents selected by the cell information 81 and 82 is changed, the OK button 83 is selected. When the cell attribute is not changed, the cancel button 84 is selected, and the dialog 80 is closed.

Then, the data structure of the form format file 470 containing the above-mentioned defined cell attribute will be described. In the following description, an item for displaying an item title on the upper portion of the cell will be referred to as "table top item". An item for displaying an item title on the left-hand side of the cell will be referred to as "table side item". In the electronic form 30, the cells of the customer name 31 and the membership number 33 are set to table side items, and the commodity number 371 and the trade name 372 are set to table top items.

FIG. 10 is a diagram showing the data structure of the form format file 470 according to this embodiment. As shown in FIG. 10, the form format file 470 includes form information 51, a table list 52, a character area list 53 and an item list 54.

The form information is information for managing the whole of the form format. The table list 52 is a list for storing the contents of the tables in the form format by the number of tables. The character area list 53 is a list for storing information of the character areas in the form format by the number of the character areas. The item list 54 is a list for storing information of items in the table by the number of items.

As shown in FIG. 10, the form information 51 includes a form title 511, a size 512, a table number 513, table list pointer information 514, a character area number 515 and character area list pointer information 516.

The form title 511 is information indicative of the title of the electronic form 30. The size 512 is information indicative of the size of the electronic form 30. The table number 513 is information indicative of the number of tables in the form format. The table list pointer information 514 is information indicative of a pointer to the table list 52.

The character area number 515 is information indicative of the number of character areas in the form format. The character area list pointer information 516 is information indicative of a pointer to the character area list 53.

As shown in FIG. 10, the table list 52 includes a table title 521, position information 522, a size 523, outer frame display information 524, a dimension number 525, item list pointer information 526 and item style information 527.

The table title 521 is information indicative of the title of table in the form format. The position information 522 is information indicative of the position of the table. The size 523 is information indicative of the size of the table. The outer frame display information 524 is information indicating whether or not the outer frame of the table should be displayed and a stroke width and a color of the outer frame or the like.

The dimension number 525 is information indicative of the dimension of the cell within the table. The item list pointer information 526 is information indicative of the pointer to the item list 54. The item style information 527 is information indicating whether the item within the table is the table top item or the table side item.

As shown in FIG. 10, the character area list 53 includes position information 531, size 532, character string 533, outer frame display information 534 and character form information 535.

The position information 531 is information indicative of the position of the character area in the form format. The size 532 is information indicative of the size of the character area. The character string 533 is information indicating characters such as "PURCHASE ORDER FORM" in the character area.

The outer frame display information 534 is information indicating whether or not the outer frame of the character area should be displayed and the stroke width and the color of the outer frame or the like. The character form information 535 is information indicative of a form such as a font of the character string 533 in the character area.

As shown in FIG. 10, the item list 54 includes an item title 541, position information 542, a size 543, outer frame display information 544, cell information 545 and a form data storage area 546.

The item title 541 is information indicative of title of an item in the table. The position information 542 is information indicative of the position of the item. The size 543 is information indicative of the size of the item. The outer frame display information 544 is information indicating whether or not the outer frame of the item should be displayed and the stroke width and the color of the outer frame or the like.

The cell information 545 is information indicative of a display attribute which indicates whether or not form data of the item should be displayed. The form data storage area 546 is an area for storing displayed form data.

Figure 11A:
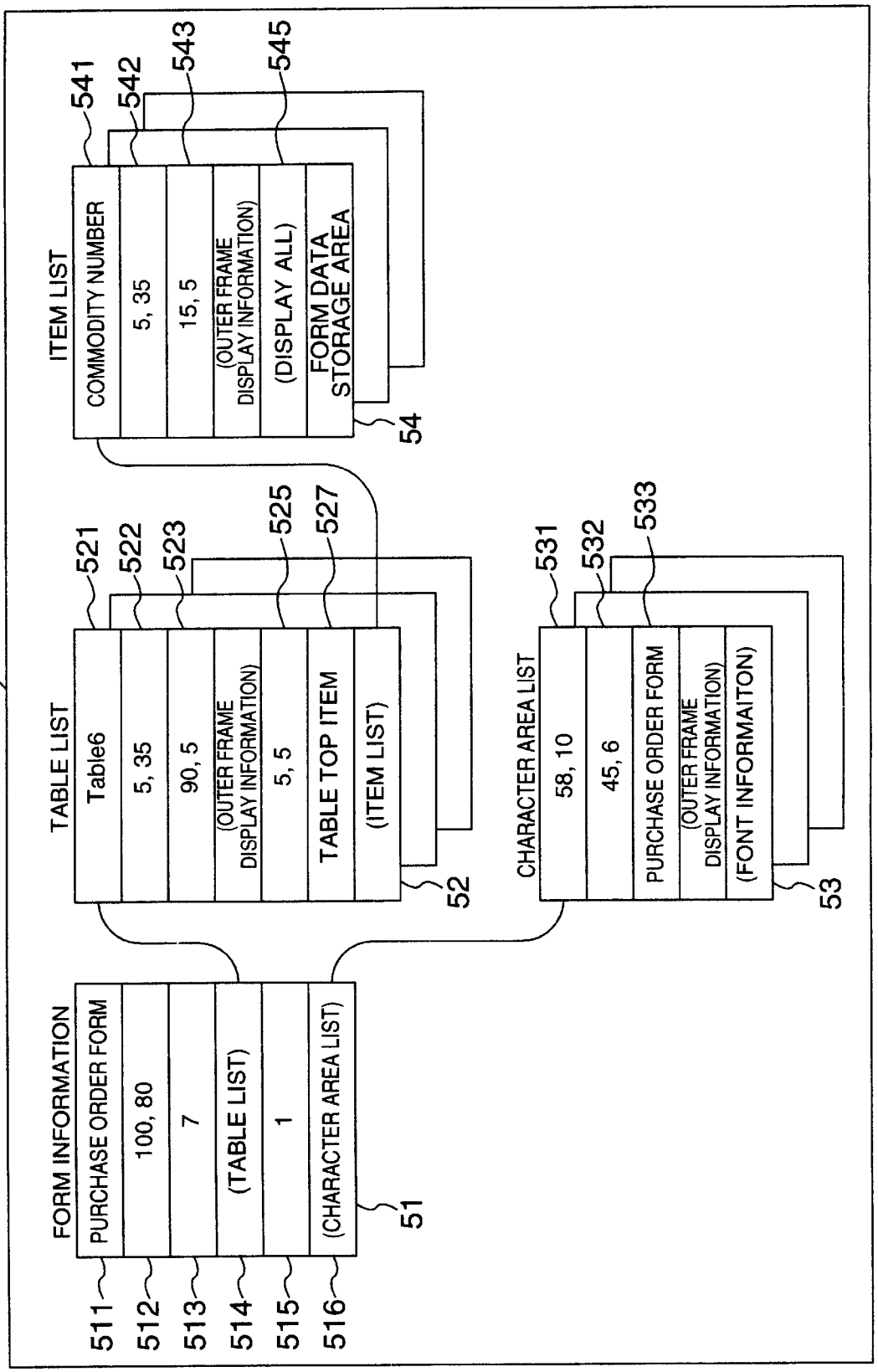
FIGS. 11A and 11B are diagrams showing a data structure of the electronic form format file 470 obtained in the case of the electronic form 30 shown in FIG. 7 according to an embodiment of the present invention.
Figure 11B:
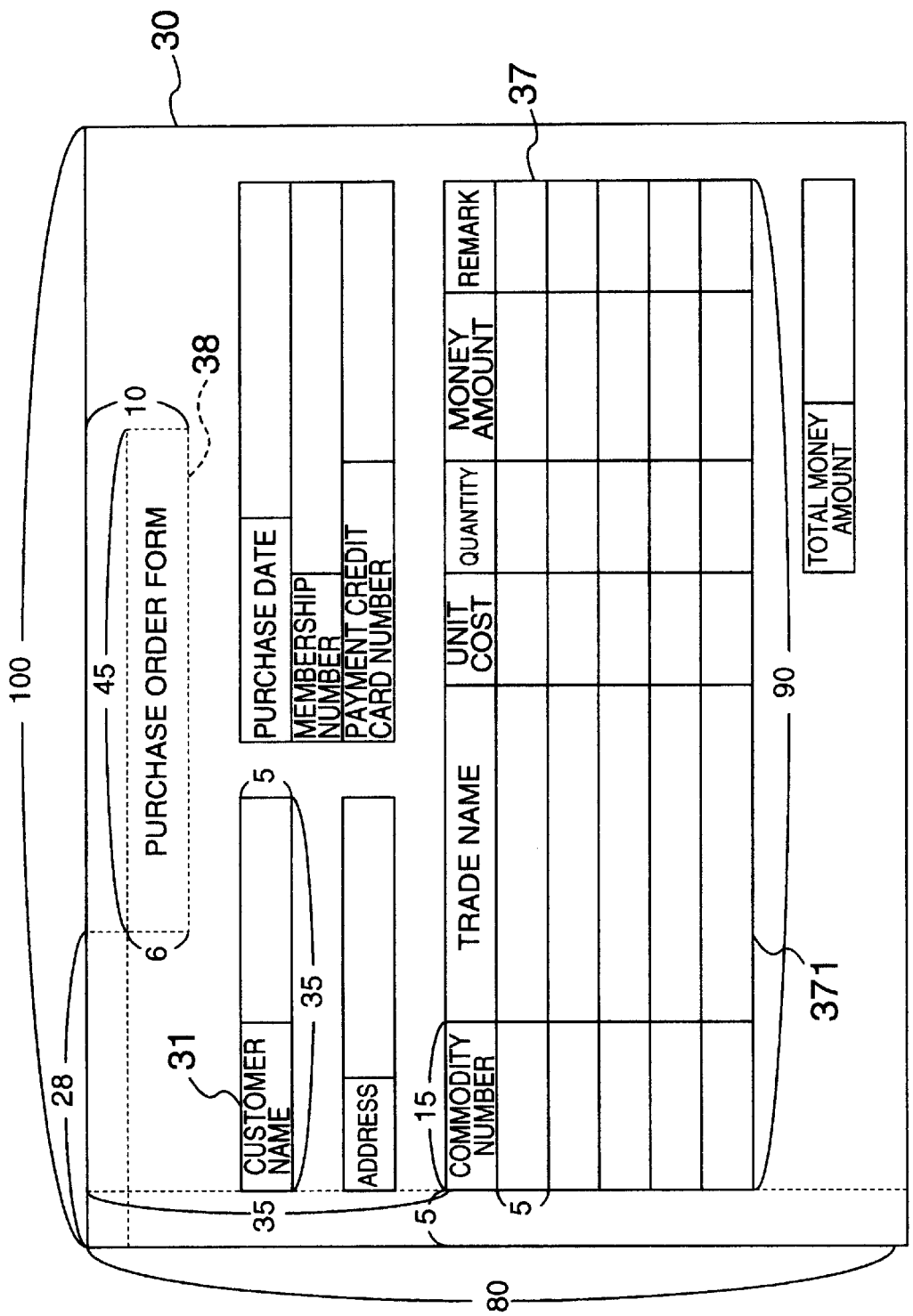

FIG. 11A is a diagram showing the data structure of the form format file 470 obtained in the case of the electronic form 30 shown in FIGS. 7 and 11B according to this embodiment. As shown in FIG. 11A, in the form format file 470, "purchase order form" which is the title determined by the person who makes the form is memorized in the form title 511 as the form information 51, (100, 80) is memorized in the form size 512, "7" is memorized in the table number 514 because there are seven tables ranging from the customer name 31 to the detail portion 37, and "1" is memorized in the character area number 515 because the form title character area 38 is one of the character areas. Here, numerals within the parenthesis denote position coordinates.

In the table list 52 obtained in the case of the detail portion 37, "Table 6" is memorized in the table title 521 as the title, (5, 35) is memorized in the table position information 522, (90, 5) is memorized in the table size 523, and (5, 5) is memorized in the dimension number 525 because there are 5 records of 5 items from the commodity number 371 to the money amount 375. Also, the item style information 527 indicates the table top item.

In the character area list 53 of the form title character area 38, the position information 531 becomes (28, 10), the size 532 of the form title character area 38 becomes (45, 6), and the character string 533 becomes "PURCHASE ORDER FORM" that is displayed on the form.

In the item list 54 of the commodity number 371, the item title 541 is set to "commodity number", the item position information 542 is set to (5, 35), the size 543 is set to (15, 5), and the cell information 545 is set so as to display the cell regardless of the state of the form data of the cell.

Figure 12:
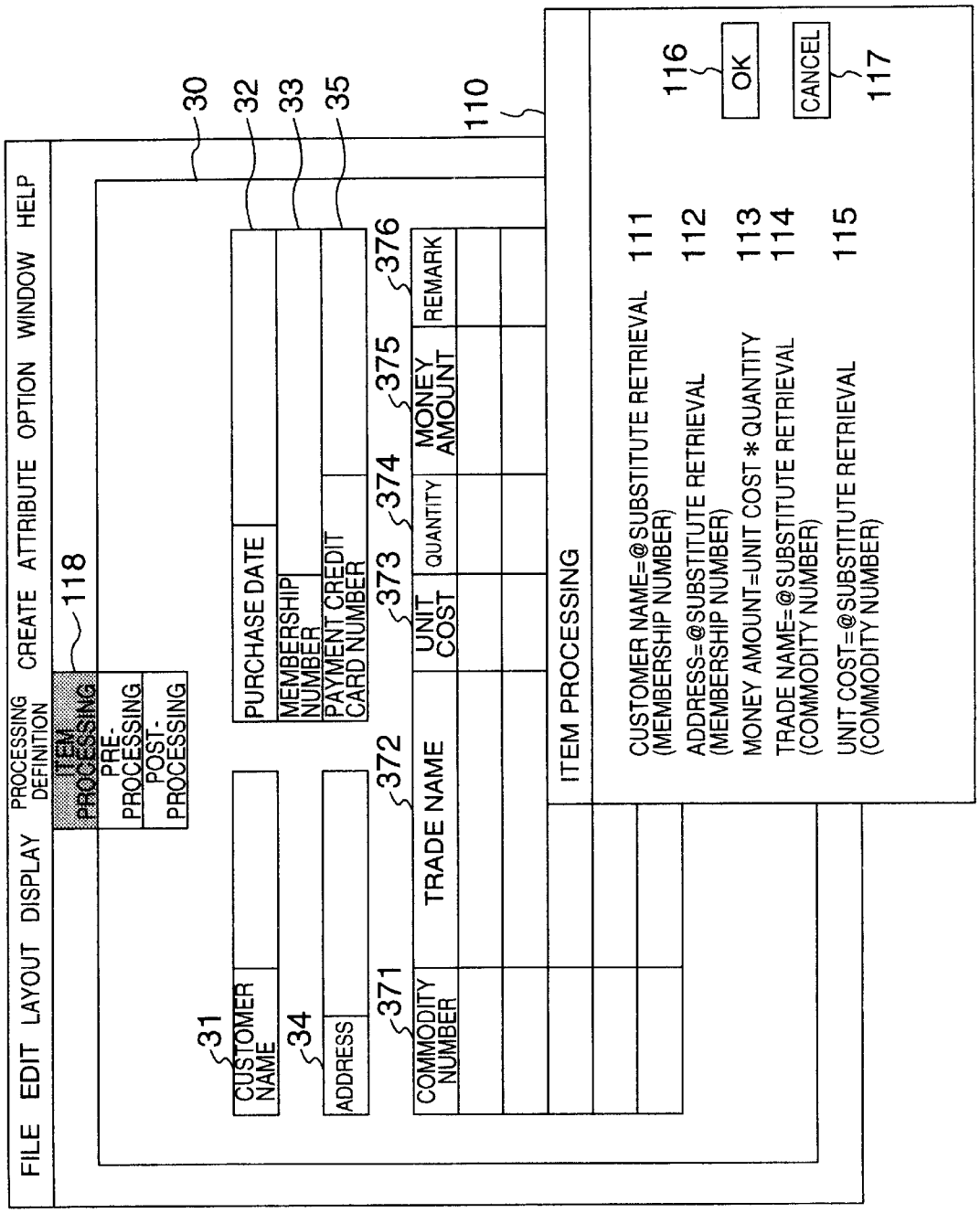
FIG. 12 is a diagram showing a picture of a window in which a field processing definition program 499 is executed according to an embodiment of the present invention.

FIG. 12 is a diagram showing a picture in which the item process defining program 499 is executed according to this embodiment. As shown in FIG. 12, the item process defining execution picture according to this embodiment includes a dialog 110, item processing contents 111 to 115, an OK button 116, a cancel button 117 and an item processing 118.

The dialog 110 is a picture capable of setting the contents of the item processing contents 111 to 115. The item processing contents 111 to 115 are information indicative of the contents of the respective item processing. The OK button 116 is a button capable of changing the item processing contents 111 to 15 to the contents defined by the dialog 110.

The cancel button 117 is a button capable of canceling the change of the item processing contents 111 to 115 to the contents defined at the dialog 110. The item processing 118 is a menu capable of selecting the contents of the processing definition.

The contents of the item processing required when the purchaser A enters form data into the electronic form 30, which is the purchase application form made by the procedures shown in FIGS. 2 to 11, as necessary items will be described below by way of example. When the purchaser A selects a command [process defining]–[item processing] in the item processing 118, the dialog 110 is displayed on the screen.

When the membership number 33 and the commodity number 371 are inputted to the cells as form data, the values of the corresponding customer name 31, the corresponding customer address 34, the corresponding trade name 372 and the corresponding unit cost 373 are searched from the database, and form data are respectively displayed on the cells of the customer name 31, the customer address 34, the trade name 372 and the unit cost 373. Also, when form data is inputted to the cell of the quantity 374, the money amount 375 is calculated, and the calculated value is displayed on the cell.

The item processing contents 111 to 115 are those obtained by searching or calculating the customer name 31, the customer address 34, the money amount 375, the trade name 372 and the unit cost 373. When the item processing contents 111 to 115 are changed to the contents defined in the dialog 110, the OK button 116 is selected. When on the other hand the item processing contents 111 to 115 are not changed to the contents defined in the dialog 110, the cancel button 117 is selected, and then the dialog 110 is closed.

Figure 13:
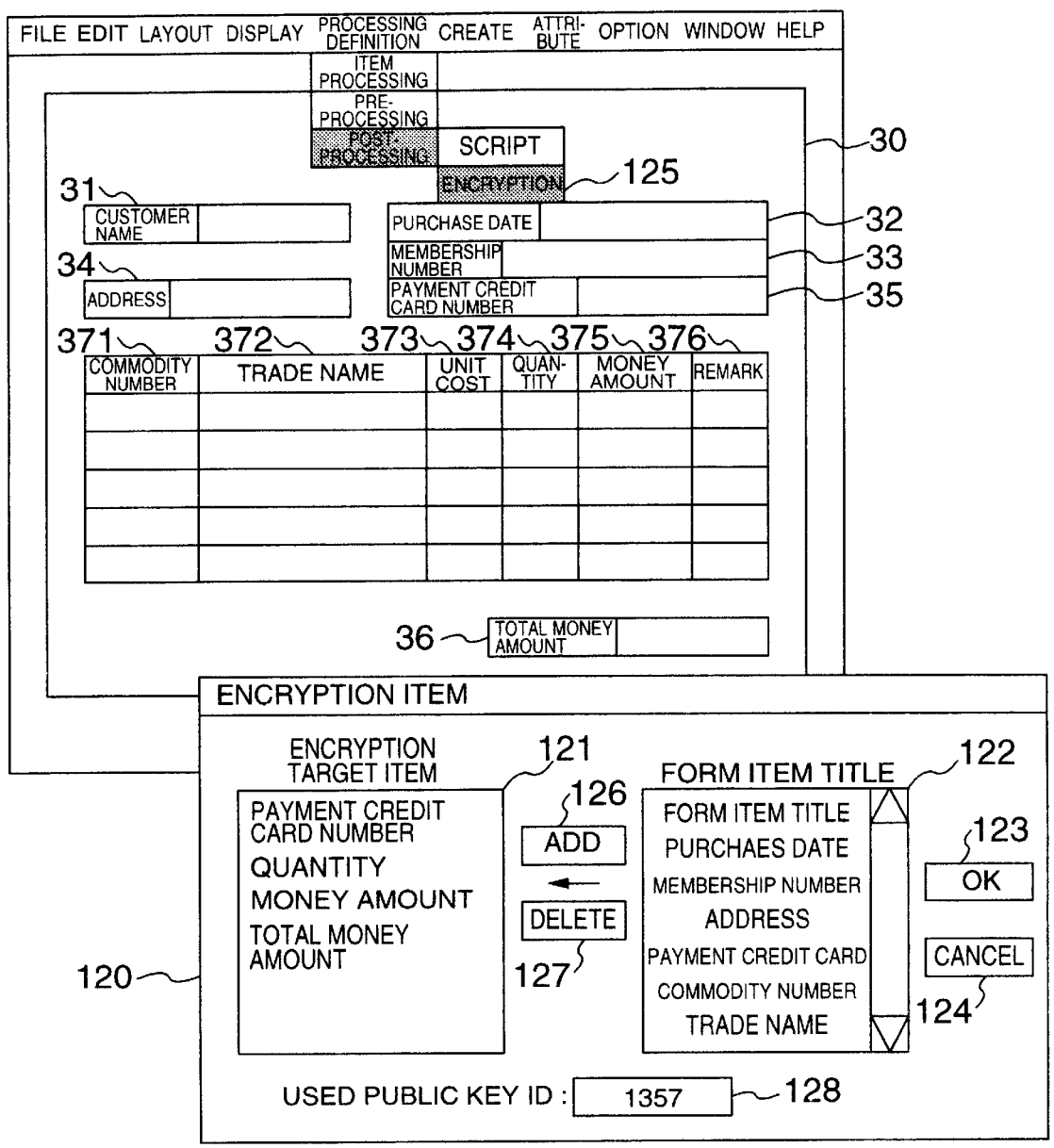
FIG. 13 is a diagram showing a picture of a window in which a post-processing definition program 476 is executed according to an embodiment of the present invention.

FIG. 13 is a diagram showing a picture in which the postprocessing defining program 476 according to this embodiment is executed. As shown in FIG. 13, the postprocessing execution picture according to this embodiment includes a dialog 120, an encryption target item 121, a form item title 122, an OK button 123, a cancel button 124, a selection menu 125, an add button 126, a delete button 127 and a public key ID 128.

The dialog 120 is a picture for setting the contents of the encryption target item 121. The encryption target item 121 is an item indicating the encryption target. The form item title 122 represents a title of form data in the electronic form 30. The OK button 123 is a button capable of changing the encryption target item 121 into the contents defined at the dialog 120.

The cancel button 124 is a button for canceling the change of the encryption target item 121 to the contents defined at the dialog 120. The selection menu 125 is a menu capable of selecting the contents of the processing definition. The add button 126 is a button capable of adding a specific item to the encryption target item 121.

The delete button 127 is a button capable of deleting a specific item from the encryption target item 121. The public key ID 128 is a code capable of identifying the worker corresponding to the public key 67 used in the encryption.

As shown in FIG. 13, the encryption of the form data is defined as the postprocessing. When a command [processing definition]–[postprocessing]–[encryption] is selected by the selection menu 125, the dialog 120 is displayed on the screen.

The payment credit card number 35, which will bring about a disadvantage if it is learned by the third party, the quantity 374, the money amount 375 and the total amount 36, which will be altered by the unauthorized person, should be encrypted by the processing apparatus in order to prevent an illegal order.

An encrypted item is selected from a list of the form item title 122, and registered on the encryption target item 121 by an add button 126. If the registration of the encrypted item is deleted, the deleted item is selected from the encryption target item 121, and deleted by selecting the delete button 127.

The worker ID corresponding to the public key 67 used in the encryption is designated by the public key ID 128. Here, let it be assumed that "137" which is the ID number 61 of the private key 64 of the worker C is designated. Then, the encrypted form data can be decrypted only by the private key 64 of the worker C. Incidentally, since only the encrypted portion of the received form data is decrypted, a time necessary for decrypting the encrypted portion can be decreased.

When the defined contents are memorized and the processing is ended, the OK button 123 is selected. When the defined contents are deleted, the cancel button 124 is selected, and the dialog 120 is closed.

In the electronic document system according to this embodiment, the electronic form 30 is defined by the above-mentioned procedures. The form format file 470 is made common to all workers, and the process defining file 471 is different for every worker. Before the business is started, these files are distributed to workers other than the purchaser A in advance by using a recording medium such as the floppy disk 45 or the electronic mail.

The definition work for effecting the electronic form processing work has been described so far. After this definition work is finished, the purchaser A enters form data into the electronic form 30 by using the form processing apparatus 3 in order to apply for the purchase order. The details of the procedure executed by the purchaser A in the form processing apparatus 3 will be described with reference to a flowchart of FIG. 14.

Figure 14:
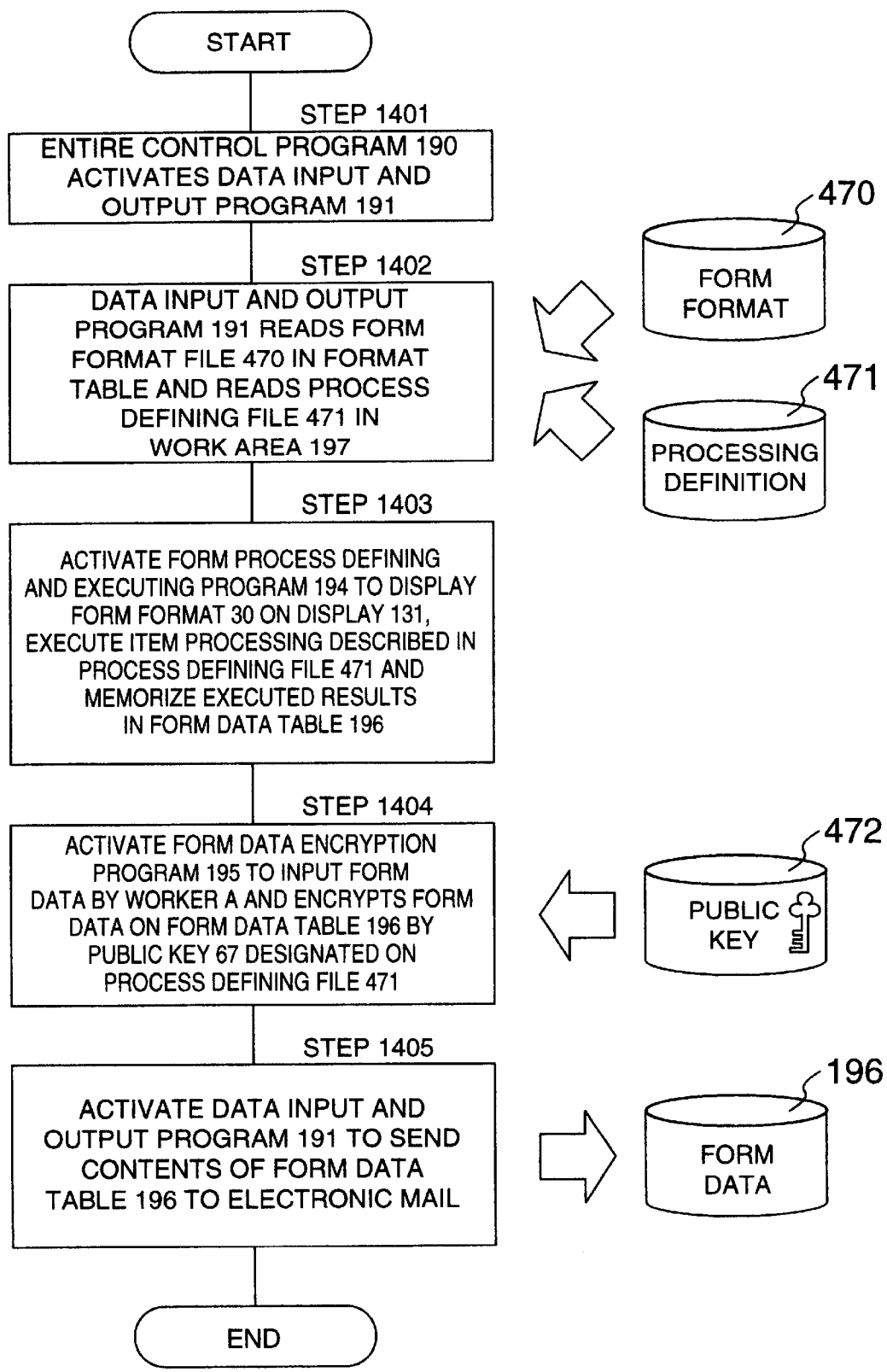
FIG. 14 is a flowchart showing a procedure in which a purchaser A makes a purchase application according to an embodiment of the present invention.

FIG. 14 is a flowchart showing the procedure in which the purchaser A applies for the purchase order. Referring to FIG. 14, and following the start of operation, in step 1401, when the purchaser A instructs the start of the form issue work by the form processing apparatus 3 which may be connected to the internet 22, the entire control program 190 activates the data input and output program 191.

In step 1402, when a URL (Uniform Resource Locator) indicative of a home page address of a desired electronic mail is designated in the WWW browser, the data input and output program 191 issues an information transfer request to the electronic mall server 4 having that URL. Then, the data input and output program 191 receives the form format file 470 and the process defining file 471 transferred from the electronic mall server 4 and temporarily writes the same in the hard disk 137. Further, the form format file 470 is written in the form format table 199 on the main memory 139, and the process defining file 471 is written in the work area 197.

In step 1403, the entire control program 190 activates the form process defining and executing program 194 to display the contents of the form format table 199 on the display 131 of the form processing apparatus 3 as the electronic form 30.

The form process defining and executing program 194 executes the processing defined as the item processing of the process defining file 471 in response to the form data inputted from the purchaser A. The item processing is executed in the work area 197, and the inputted form data and form data obtained as a result of the item processing are memorized in the form data table 196.

FIG. 15 is a diagram showing an example of a processing picture obtained after form data was inputted according to this embodiment. Form data of the electronic form 30 are classified into information such as the customer name 31 and the customer address 34 which will cause no trouble if they are learned by a third party and information such as the payment credit card number 35 which will bring about a disadvantage if they are learned by a third party.

The form process defining and executing program 194 displays the information as "*" when the information is inputted in order to hide the information, which will cause a disadvantage if it is learned by a third party, as much as possible. Then, the form process defining and executing program 194 executes the processing such as inputting such information twice in order to avoid the information from being inputted erroneously. Here, the form data of the payment credit card number 35 is displayed in the form of "*".

FIG. 16 is a diagram showing the state of the form data table 196 on the main memory 139 according to this embodiment. As shown in FIG. 16, the form data table 196 includes an ID number memory area 1203, form data storage areas 1204 to 1221 and an encryption flag 1222.

The ID number memory area 1203 is an area which memorizes the ID number 65 of the worker corresponding to the public key 67 used in the encryption. The form data storage areas 1204 to 1221 are areas in which respective form data are stored. The encryption flag 1222 is a flag which indicates whether or not form data should be encrypted.

The form process defining and executing program 194 stores data of the customer name in the form data storage area 1204, stores data of the customer address 34 in the form data storage area 1205, stores data of the purchase date 32 in the form data storage area 1206, stores data of the membership number 33 in the form data storage area 1207, and stores data of the credit card number 35 in the form data storage area 1208.

Also, the form process defining and executing program 194 memorizes data of the commodity number 371 in the form data storage areas 1209 and 1215, memorizes data of the trade name 372 in the form data storage areas 1210 and 1216, memorizes data of the unit cost 373 in the form data storage areas 1211 and 1217, memorizes data of the quantity 374 in the form data storage areas 1212 and 1218, memorizes data of the money amount 375 in the form data storage areas 1213 and 1219, memorizes data of the remark 376 in the form data storage areas 1214 and 1220, and memorizes data of the total money amount 36 in the form data storage area 1221.

Further, the form process defining and executing program 194 (FIG. 3) sets a flag "1" to an encryption flag 1222 (FIG. 16) of the item which is designated to be encrypted upon process defining.

When the end of the processing is instructed by the purchaser A, in the step 1404 (FIG. 14), the form process defining and executing program 194 encrypts form data in accordance with the contents defined as the postprocessing of the process definition.

Specifically, the form process defining and executing program 194 activates the form data encryption program 195 to search the ID number 65 (FIG. 5B) of the public key file 472 on the electronic mall server 4 by the form data encryption program 195. Then, the public key 67 (FIG. 5B) corresponding to the ID number 65 of the ID number memory area 1203 is stored in the work area 197. Here, the ID number 65 searches the public key 67 of the worker C of "1357".

The form data encryption program 195 encrypts the payment credit card number 35, the quantity 374, the unit cost 373 and the total money amount 36 (FIG. 7), which are set to "1" in the encryption flag 1222, by the public key 67 in which the ID number 35 (FIG. 5B) is "1357" (FIG. 16) and the public-key cryptosystem algorithm, and limits the worker who may refer to the corresponding form data to the worker C.

In a step 1405, the entire control program 190 again activates the data input and output program 191 to send the electronic form 30 including encrypted form data to the worker B over the network.

Although the form format file 470 and the process defining file 471 are read in the hard disk 137 over the network in the step 1402, the present invention is not limited thereto, and the form format file 470 and the process defining file 471 may be memorized in the hard disk 137 through a recording medium such as a CD-ROM.

The worker B receives form data whose one portion (form data of the payment credit card number 35, the unit cost 373, the quantity 374, the money amount 375 and the total money amount 36) through the network, and checks the contents of the form data thus received.

The processing executed by this worker B will be described with reference to a flowchart of FIG. 17. Incidentally, let it be assumed that the private key 64 for decryption is not distributed to the worker B and that the encryption is not set in the process defining file 471 of the worker B as the postprocessing.

Figure 17:
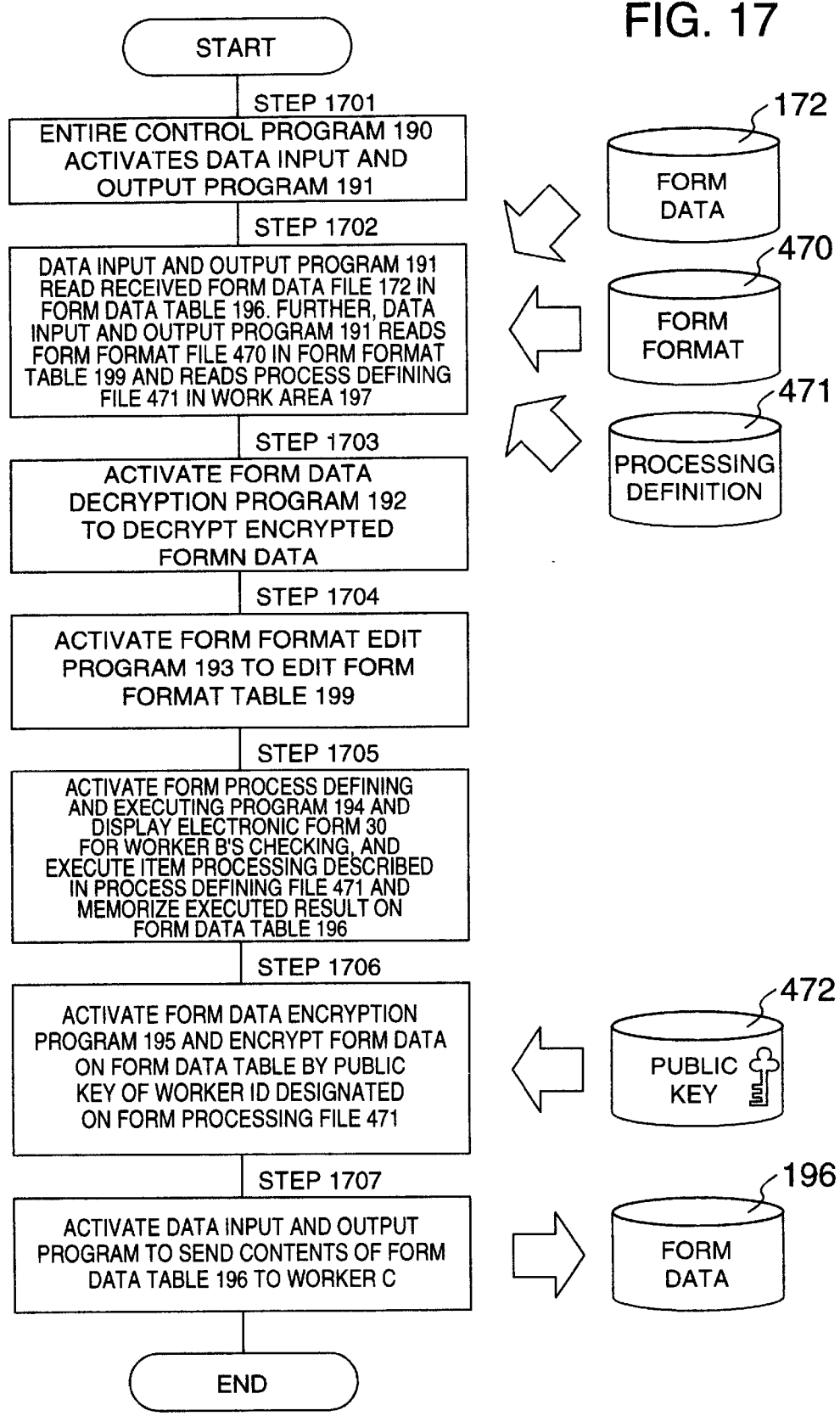
FIG. 17 is a flowchart showing a procedure in which a worker B makes a check according to an embodiment of the present invention.

FIG. 17 is a flowchart showing the procedure in which the worker B checks the contents of the received form data. Referring to FIG. 17, and following the start of operation, in a step 1701, the worker B instructs the start of the form processing work on the form processing apparatus 1 that can be connected to the internet 22, whereby the entire control program 190 activates the data input and output program 191.

In step 1702, the data input and output program 191 reads form data of the electronic form 30 transmitted through the network from the purchaser A in the form data table 196 on the main memory 19. Further, the data input and output program 191 reads the form format file 470 in the form format table 199, and reads the process defining file 471 in the work area, respectively.

In step 1703, the entire control program 190 activates the form data decryption program 192 to decrypt the form data table 196. In step 1704, the entire control program 190 activates the form format edit program 193 to edit the form format table 199.

In step 1705, the entire control program 190 activates the form process defining and executing program 194 to display the contents of the form format table 199 and the form data table 196 on the display 11 of the form processing apparatus 1 as the electronic form 30.

FIG. 18 is a diagram showing an example of a picture in which the worker B executes the processing according to this embodiment. As shown in FIG. 18, the encrypted payment credit card number 35, the unit cost 373, the quantity 374, the money amount 375 and the total money amount 36 and their cells are not displayed on a form processing picture 1800 of the worker B.

In step 1705, the form process defining and executing program 194 executes the processing defined as the item processing of the process defining file 471, and the worker B visually checks whether or not necessary form data should be inputted.

When the worker B instructs the end of the processing, if the encryption is defined as the postprocessing of the processing definition, then in step 1706, form data is encrypted in accordance with the contents of the postprocessing. Here, the encryption is not defined, and hence form data is not encrypted.

In step 1707, the entire control program 190 activates again the data input and output program 191 to send the electronic form 30 including the encrypted form data to the network, from which the electronic form 30 is transferred to the worker C. This is a flow of a form processing executed by the worker B. The details of decrypting form data at the step 1703 will be described next with reference to a flowchart of FIG. 19.

Figure 19:
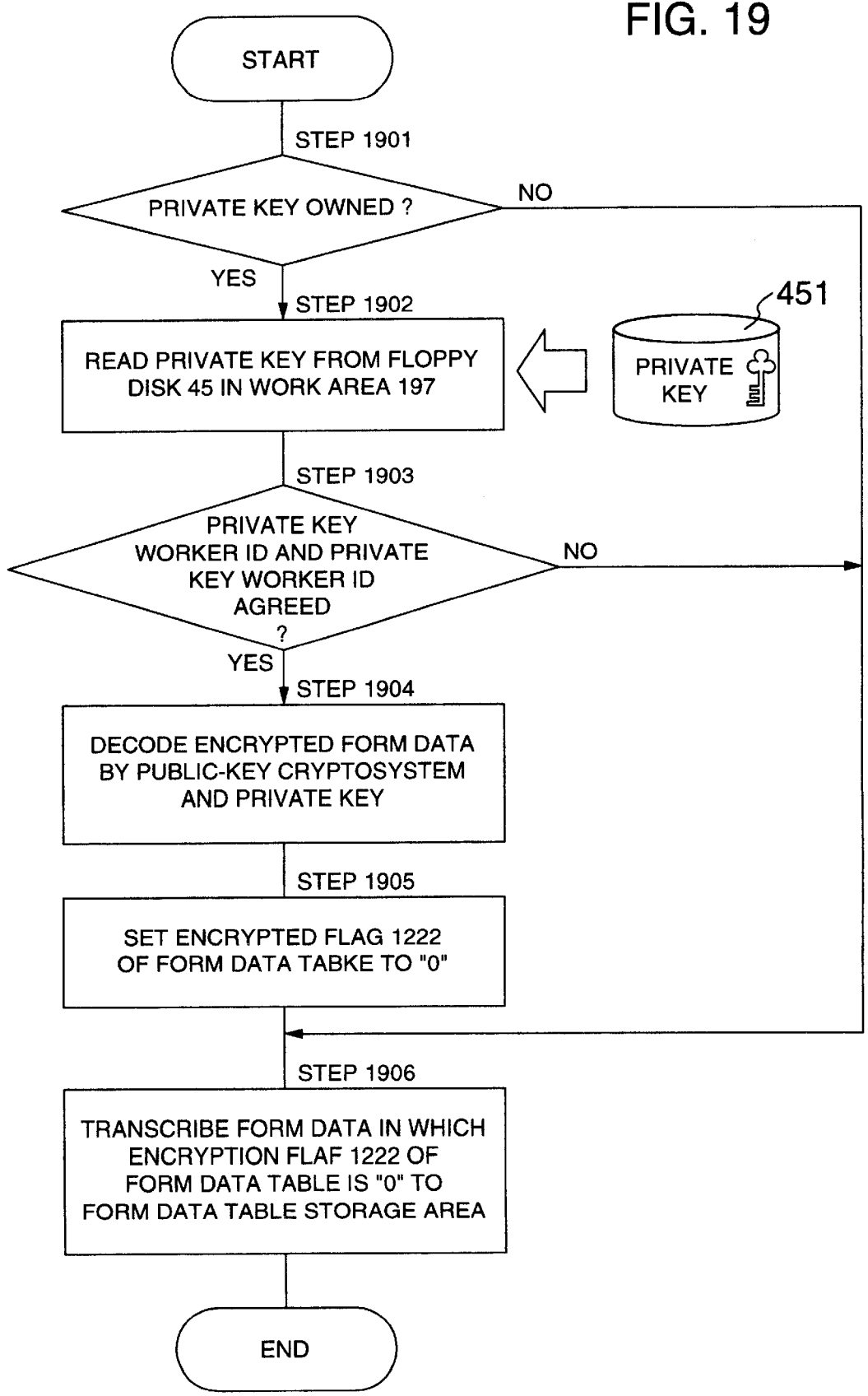
FIG. 19 is a flowchart showing a procedure of decrypting electronic form data according to an embodiment of the present invention.

FIG. 19 is a flowchart showing the procedure of decrypting form data according to this embodiment. Referring to FIG. 19, and following the start of operation, in the next decision step 1901, it is checked whether or not the private key file 451 is recorded on the floppy disk 45 which is loaded onto the floppy disk drive 14. If the private key file 451 is not recorded on the floppy disk 45 as represented by a NO at the decision step 1901, then control goes to step 1906. If the private key file 451 is recorded on the floppy disk 45 as represented by a YES at the decision step 1901, then control goes to step 1902, whereat the private key file 451 is read in the work area 197.

In the next decision step 1903, it is determined whether or not the ID number 61 of the private key file 451 and the ID number 65 in the ID number memory area 1203 of the form data table 196 agree with each other. If the ID number 61 and the ID number 65 agree with each other (if there is the private key 64 in which the ID number 61 of the worker is "1357") as represented by a YES at the decision step 1903, then control goes to a step 1904. If not as represented by a NO at the decision step 1903, then control goes to the step 1906.

In the step 1904, the encrypted form data in the form data table 196 is decrypted by using the public-key cryptosystem algorithm and the private key 64. In the next step 1905, the encryption flag 1222 of the decrypted form data in the form data table 196 is set to "0".

In the step 1906, form data in which the encryption flag 1222 of the form data table 196 is "0" is transcribed in the form data storage area 546 of the form format table 199.

The details of editing the form format in the step 1704 will be described with reference to a flowchart of FIG. 20. While this processing is executed at every table on the form, the manner in which the detail portion 37 is edited on the form processing picture 1800 of FIG. 18 will be described below.

Figure 20:
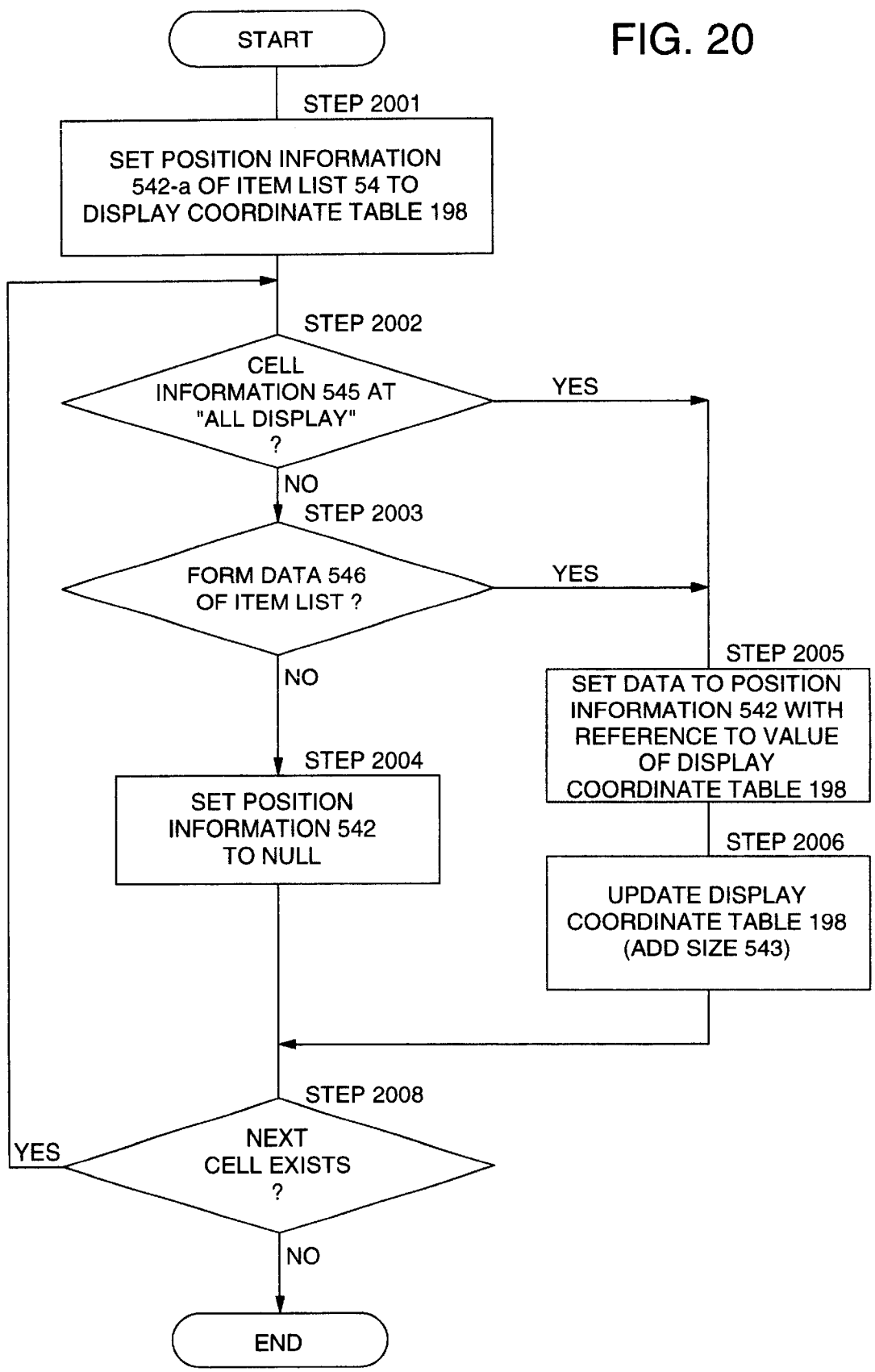
FIG. 20 is a flowchart showing a procedure of editing an electronic form format according to an embodiment of the present invention.

FIG. 20 is a flowchart showing the procedure of editing the form format according to this embodiment. Referring to FIG. 20, and following the start of operation, in step 2001, with reference to a value of position information 542-*a* of the first item of the item list 54 of the form format table 199 expanded on the main memory 19, an abscissa and an ordinate for displaying the corresponding item are memorized in the display coordinate table 198 on the main memory 19.

In the next decision step 2002, the contents of cell information 545 are checked. If the cell information 545 is not at "all displayed" as represented by a NO at the decision step 2002, then control goes to the next decision step 2003. If on the other hand the cell information 545 is at "all displayed" as represented by a YES at the decision step 2002, then control goes to a step 2005.

In the decision step 2003, it is determined whether or not form data is stored in the form data storage area 546. If form data is not stored in the form data storage area 546 as represented by a NO at the decision step 2003, then control goes to step 2004, whereat NULL is written in the position information of the corresponding item. If form data is stored in the form data storage area 546 as represented by a YES at the decision step 2003, then control goes to step 2005.

In the step 2005, the value of the display coordinate table 198 is written in the position information 542 of the corresponding item. In the next step 2006, the display coordinates of the display coordinate table 198 are updated in response to the value of the size 543 of the corresponding item.

Specifically, when the corresponding item is the table top item, of the size 543 of the corresponding item, only the numeral on the abscissa is added to the value of the abscissa of the display coordinate table 198. When the corresponding item is the table side item, of the size 543 of the corresponding item, only the value of the ordinate is added to the value of the ordinate of the display coordinate table 198. Then, control goes to the next decision step 2008.

If there is the next cell as represented by a YES at the decision step 2008, then control goes back to the step 2002, and the following steps are repeated. If there is no cell as represented by a NO at the decision step 2008, the edit processing of the form format is ended.

A concrete example in which the form format is edited in the electronic document processing system according to this embodiment will be described below.

Figure 21:
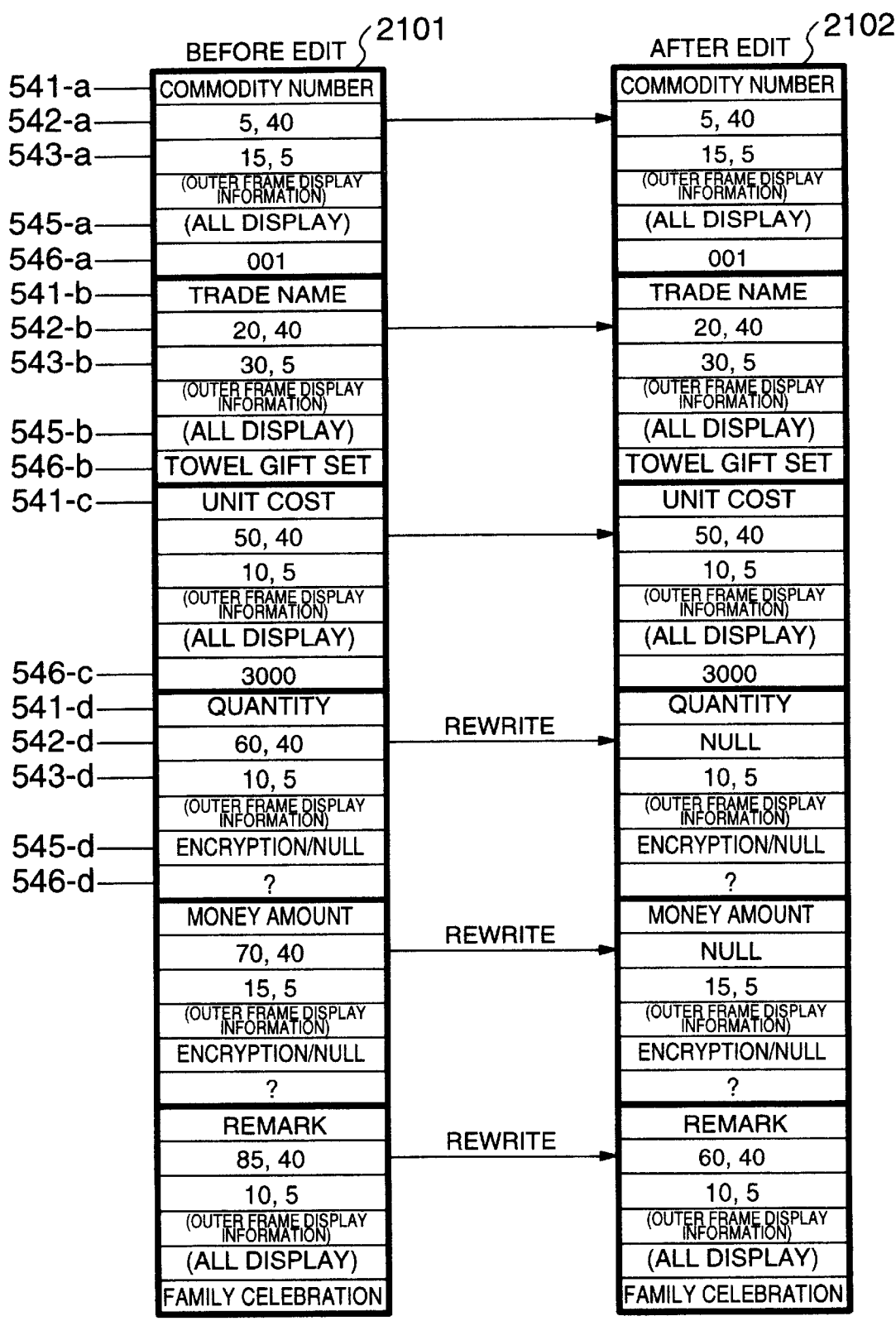
FIG. 21 is a diagram showing the state of a detail portion 37 of a form format table 199 according to an embodiment of the present invention.

FIG. 21 is a diagram showing the state of the detail portion 37 of the form format table 199 according to this embodiment. As shown in FIG. 21, a pre-edit detail portion 2101 is table indicating the contents of the detail portion 37 obtained before being edited. A post-edit detail portion 2102 is a table indicating the contents of the detail portion 37 obtained after being edited.

(1) In the case of the item of the commodity number 371:

In the step 2001, with reference to the value of the position information 542-*a* of the first item of the item list 54 of the form format table 1999 expanded on the main memory 19, the abscissa and the ordinate both of which display the corresponding item are memorized in the display coordinate table 198 on the main memory 19.

In the next step 2002, the contents of the cell information 545-*a* are checked. If the cell information 545-*a* is not at "all display", then control goes to the next step 2003. If on the other hand the cell information 545-*a* is at "all display", then control goes to the step 2005. As shown in FIG. 21, the cell information 545-*a* is at "all display", and hence control goes to the step 2005.

In the step 2005, the value of the display coordinate table 198 is written in the position information 542-*a*. In the next step 2006, the display coordinates of the display coordinate table 198 are updated in response to the value of the size 543-*a*.

Specifically, when the corresponding item is the table top item, of the size 543-*a*, only the numeral of the abscissa is added to the value of the abscissa of the display coordinate table 198. When the corresponding item is the table side item, of the size 543-*a*, only the value of the ordinate is added to the value of the ordinate of the display coordinate table 198.

Since the commodity number is the table top item and the position information 542-*a* is (5, 40) and the size 543-*a* is (15, 5), the value of the display coordinate table 198 is updated to (20, 40).

After the value of the display coordinate table 198 was updated, control goes to the step 2008, whereat the item of the trade name 372 follows the item of the commodity number 371, and hence control goes back to the step 2002 from the step 2008.

(2) In the case of the item of the trade name 372:

Since the cell information 545-*b* is at "all display" in the step 2002, control goes to the step 2005. In the step 2005, the values (20, 40) of the display coordinate table 198 are written in the position information 542-*b*.

In the step 2006, the display coordinates of the display coordinate table 198 are updated in response to the value of the size 543-*b*. Specifically, since the trade name 372 is the table top item and the position information 542-*b* is (20, 40) and the size 543-*b* is (30, 5), the value of the display coordinate table 198 is updated to (50, 40). After the value of the display coordinate table 198 was updated as described above, control goes back to the step 2002 from the step 2008.

(3) In the case of the item of the unit cost 373:

The steps 2002 to 2006 are similar to those in the trade name 372. Incidentally, in the step 2006, the display coordinates of the display coordinate table 198 are updated to (60, 40) as described above.

(4) In the case of the item of the quantity 374:

Since the cell information 545-*d* is not at "all display" in the step 2002, control goes to the step 2003, whereat it is determined whether or not form data is stored in the form data storage area 546-*d*.

Since the form data of the corresponding item is encrypted and the decrypted form data is not stored in the form data storage area 546-*d*, control goes from the step 2003 to the step 2004, whereat the position information 542-*d* is rewritten into NULL. Since it is determined at the decision step 2008 that there is the next cell, control goes back to the step 2002.

(5) In the case of the item of the money amount 375:

The steps 2002 to 2004 are similar to those of the quantity 374.

(6) In the case of the item of the remark 376:

The steps 2002 to 2006 are similar to those of the trade name 372. Incidentally, since the display coordinates of the display coordinate table 198 are still updated to (60, 40) in the step 2006 of the unit cost 373, the display coordinates of the remark 376 are presented as (60, 40), and the remark 376 is displayed as shown in FIG. 18.

According to the above-mentioned processing, the encrypted form data which cannot be referred to is not displayed on the screen, and an item which is not necessary for the work of the worker is not displayed.

The worker C receives the electronic form 30 whose contents are checked by the worker B over the network, and approves the checked electronic form 30. The flow of the processing executed until the electronic form 30 is displayed is the same as that described in the case of the worker B.

Since the worker C possesses the private key 64, the floppy disk 45 is set on the floppy disk drive 14 before the work is started. When the worker C instructs the display of the electronic form 30, the form data of the received electronic form 30 is displayed on the 20 screen.

Since the ID number 61 of the private key 64 of the worker C is "1357", it is possible to decrypt the form data that was encrypted by the purchaser A. Since the encrypted form data of the electronic form 30 is decrypted and all form data can be referred to, the processing picture is presented as shown in FIG. 22.

FIG. 22 is a diagram showing an example of a processing picture of the worker C. The worker C examines whether or not the payment credit card number 35 is valid (whether a report of robbery is submitted or whether an amount of consumed money exceeds an upper limit). If the payment credit card number 35 is valid, then the worker C approves the payment credit card number 35.

After the payment credit card number 35 was approved by the worker C, the payment credit card number 35, the money amount 375 and the total money amount 36 are again encrypted by the public key 67 of the payment worker, and the quantity 374 is again encrypted by the public key 67 of the delivery worker. Incidentally, when form data are each encrypted by different public keys 67 as described above, the ID number memory area 1203 is provided at every form data.

In order to dispatch the commodity, the electronic form 30 is transferred to the delivery section server 5. Since the private key 64 of the delivery worker for decrypting the quantity 374 of the form data encrypted by the worker C is distributed to the delivery section server 5, although the delivery worker is able to refer to the quantity 374 which relates to the dispatch of the commodity, the delivery worker is unable to see the form data such as the payment credit card number 35 which is not related to the dispatch of the commodity.

At the completion of the delivery processing, the delivery worker again encrypts the quantity 374 by the public key 67 of the payment worker, and transmits the form data to a credit company (payment server 6) as a credit card charge processing.

Since the private key 64 for decrypting the form data encrypted by the worker C or the delivery worker is distributed to the payment server 6, the payment worker is able to refer to all form data including the payment credit card number 35. The payment worker executes the payment processing for the purchaser A, and accumulates the form data of the electronic form 30 issued by the purchaser A in the payment server 6 as charge copies.

As will be understood from the operation of the above-mentioned electronic document processing system according to this embodiment, in a circulation type electronic document work, by encrypting one portion of the document, only form data which is required by some people on the business and which should be hidden from others may be encrypted so that such form data may be prevented from being looked furtively and hence the form data may be circulated safely. Also, since the document may be dynamically altered without help in response to a part of data which can be referred to, it is not necessary to create different formats for every worker.

Therefore, the electronic document processing system according to the present invention is most suitable for a work in which a document including data which should be hidden from others is circulated to a plurality of sections on the electronic mail basis and circulated data should be kept without missing.

In the processing system according to this embodiment, while the cell is not displayed in the case of the encrypted data as described above, in the case of the encrypted form data, only the cell may be displayed.

According to the above-described electronic document processing system according to this embodiment, since specific data of a plurality of data items is encrypted and decrypted by using a key corresponding to a specific worker, a time required for encrypting and decrypting an electronic document may be reduced, and the encrypted form data may be displayed for only the specific worker.

Further, according to the electronic document processing system of this embodiment, since the encrypted data is encrypted by using the encryption key of the specific worker having the right to see the encrypted data, the display state of specific data may be controlled in response to the right of each worker. Therefore, it is possible to provide a workflow system in which a worker whose grade of right is low cannot notice the existence of data that is processed by other worker.

Furthermore, according to the electronic document processing system of this embodiment, since the displayed state of the form data is controlled by changing the display attribute of the data, it is possible to decrease the number of steps of a work for defining a form format which displays an electronic document.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A document circulation method of circulating a document having a plurality of data blocks, said circulation method comprising the steps of:

encrypting a certain data block of a plurality of data blocks in a document relevant to a certain worker by using an encrypting key corresponding to said certain worker;

encrypting another data block of said plurality of data blocks in said document relevant to another worker by using another encrypting key corresponding to said another worker;

circulating said document having said certain data block encrypted by said encryption key and said another data block encrypted by said another encryption key over a network;

receiving said document having encrypted certain data block and encrypted another data block by said certain worker from said network;

decrypting said document by using a decrypting key corresponding to said certain worker;

preparing a dialog to be defined by a user as to whether a data block not correctly decrypted is to be displayed on said document; and setting a display condition that said document is displayed after deleting said data block which cannot be decrypted, when said dialog is defined by the user not to display said data block not decrypted on said document.

2. A document circulation method according to claim 1, further comprising a step of displaying a column of a data block which cannot be decrypted in the form of a blank, when the encrypted portion of said document is decrypted by using another decrypting key corresponding to said another worker.

3. A document circulation method according to claim 2, further comprising a step of displaying said document on each terminal connected to said network in order for said certain worker and said another worker to check and process contents of said certain data block and said another data block.

4. A document circulation method according to claim 1, further comprising a step of determining not to display data when there is no data to be decrypted.

5. A document circulation method according to claim 1, further comprising a step for indicating whether each of data blocks included in said document is a decrypted block, and whether said data block which cannot be decrypted is to be displayed.

6. A document circulation system for circulating a document having a plurality of data blocks, said document circulation system comprising:

an encrypting unit for encrypting a certain data block of a plurality of data blocks of a document relevant to a certain worker by using an encrypting key corresponding to said certain worker and encrypting another data block of said plurality of data blocks of said document relevant to another worker by using another encrypting key corresponding to another worker;

a dialog to be defined by a user as to whether a data block not correctly decrypted is to be displayed on said document;

a first apparatus having a transmitting unit for circulating said document having encrypted certain data block and encrypted another data block through a network; and a second apparatus having a display control unit for setting a display condition that said document is displayed after deleting said data block which cannot be decrypted if said dialog is defined not to display said data block not decrypted, when said second apparatus decrypts said document by using a decrypting key corresponding to said certain worker.

7. A document circulation system as claimed in claim 6, further comprising a third apparatus having a display control unit for displaying a column of a data block which cannot be decrypted, when said document is decrypted by using another decrypting key corresponding to said another workers in the form of a blank.

8. A document circulation system as claimed in claim 7, wherein said display control unit of said second apparatus displays said document in order for said certain worker to check and process the contents of said certain data block and said display control unit of said third apparatus displays said document in order for said another worker to check and process the contents of said another data block.

9. A document circulation system as claimed in claim 6, wherein said display control unit displays a blank data block when there is no data to be decrypted.

10. A document circulation apparatus for circulating a document having a plurality of data blocks, said document circulation apparatus comprising:

an encrypting unit for encrypting a certain data block of a plurality of data blocks of a document relevant to a certain worker by using an encrypting key corresponding to said certain worker and encrypting another data block of said plurality of data blocks of said document relevant to another worker by using another encrypting key corresponding to said another worker;

a transmitting and receiving unit for circulating said document having encrypted certain data block and encrypted another data block over a network; and a display control unit for decrypting an encrypted portion of said document received from said network by using its own decrypting key and setting a display condition, including preparing a dialog to be defined by a user as to whether a data block not correctly decrypted is to be displayed on said document, such that said document is displayed after deleting said data block which cannot be decrypted, when said dialog is defined by the user not to display said data block not decrypted on said document.

11. A document circulation apparatus as claimed in claim 10, wherein a column of a data block which cannot be decrypted, wherein said document is decrypted by using said decrypting key, is displayed in the form of a blank.

12. A document circulation apparatus according to claim 11, further comprising a data block processing unit for checking and processing contents of a decrypted data block displayed by said display control unit.

13. A document circulation apparatus according to claim 10, wherein said display control unit displays a blank data block when there is no data to be decrypted.

14. A storage medium for recording a document circulation program for circulating a document having a plurality of data blocks in such a manner that said document circulation program can be read by a computer, said storage medium comprising:

a code for encrypting a certain data block of a plurality of data blocks of a document relevant to a certain worker by using an encrypting key corresponding to said certain worker and encrypting another data block of said plurality of data blocks of said document relevant to another worker by using an encrypting key corresponding to said another worker;

a code for circulating said document having encrypted certain data block and encrypted another data block over a network;

a code for preparing a dialog to be defined by a user as to whether a certain data block not correctly decrypted is to be displayed on said document; and a code for setting a display condition that said document is displayed after deleting therefrom said certain data block which cannot be decrypted, if said dialog is defined by the user not to display said certain data block not decrypted, when said document is decrypted by using a decryption key corresponding to said certain worker.

15. A electronic document processing method for circulating an electronic document having a plurality of data groups over a plurality of workers, said electronic document processing method comprising the step of:

encrypting a certain data group of a plurality of data in a electronic document relevant to a certain worker by using an encrypting key corresponding to said certain worker;

transmitting an electronic document having encrypted data group over a network;

decrypting said encrypted data group of said electronic document by using a decrypting key corresponding to said certain worker and displaying whether said encrypted data group is decrypted correctly or displaying said document in response to the existence of said data group;

preparing a dialog to be defined by a user as to whether a data group not correctly decrypted is to be displayed on said electronic document; and displaying said electronic document after deleting said data group which cannot be decrypted, if said dialog is defined by the user not to display said data group not decrypted on said electronic document.

16. An electronic document processing method according to claim 15, further comprising a step of encrypting a certain document data by using an encrypting key of a worker who should refer to said data in order to encrypt said certain document data.

17. An electronic document processing method according to claim 15, further comprising a step of controlling a display state of document data by changing a format display attribute in response to whether encrypted document data is decrypted correctly or the existence of said document data.

18. A electronic document processing system for circulating an electronic document having a plurality of data through a plurality of workers, said electronic document processing system comprising:

a first apparatus including a data encryption processing unit for encrypting certain data of a plurality of data in an electronic document relevant to a certain worker by using an encrypting key corresponding to said certain worker, and a data input/output processing unit for transmitting and outputting an electronic document having encrypted data over a network; and a second apparatus including a data decryption processing unit for decrypting said encrypted data in said electronic document relevant to another worker by using a decrypting key corresponding to said another worker, and a process defining/executing processing unit for preparing a dialog to be defined by a user as to whether a data block not correctly decrypted is to be displayed, for displaying said data after deleting therefrom said data block which cannot be decrypted if said dialog is defined by the user not to display said data block not decrypted, and for effecting a processing in response to whether said encrypted data is decrypted correctly or the existence of said data.

19. A storage medium in which a program for enabling a computer to function as an electronic document processing system for circulating an electronic document having a plurality of data through a plurality of workers may be recorded in such a manner that said medium may be read and executed by a computer, said medium records programs for functioning a computer as:

a data encryption processing unit for encrypting specific data of a plurality of data in an electronic document relevant to a specific worker by using an encrypting key corresponding to said specific worker;

a data input/output processing unit for transmitting and receiving electronic data having encrypted specific data over a network;

a data decryption processing unit for decrypting said encrypted specific data in said electronic data by using a decrypting key corresponding to said specific worker; and a process defining/executing processing unit for preparing a dialog to be defined by a user as to whether a data block not correctly decrypted is to be displayed, for displaying data after deleting therefrom said data block which cannot be decrypted if said dialog is defined by the user not to display said data block not decrypted, and for effecting a processing in response to whether said encrypted specific data is decrypted correctly or the existence of said data.

* * * * *